United States Patent
Spitz et al.

(10) Patent No.: US 7,145,457 B2
(45) Date of Patent: Dec. 5, 2006

(54) INTEGRATED VISUALIZATION OF SECURITY INFORMATION FOR AN INDIVIDUAL

(75) Inventors: Charles F. Spitz, Wellesley, MA (US); Howard A. Abrams, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 134 days.

(21) Appl. No.: 10/887,972

(22) Filed: Jul. 9, 2004

(65) Prior Publication Data

US 2005/0099288 A1 May 12, 2005

Related U.S. Application Data

(63) Continuation-in-part of application No. 10/751,605, filed on Jan. 5, 2004, now abandoned, which is a continuation of application No. 10/417,731, filed on Apr. 17, 2003, now abandoned.

(60) Provisional application No. 60/486,673, filed on Jul. 11, 2003, provisional application No. 60/374,471, filed on Apr. 18, 2002.

(51) Int. Cl.
*G08B 13/14* (2006.01)

(52) U.S. Cl. ............... 340/572.1; 340/539.13; 340/286.02

(58) Field of Classification Search ........... 340/572.1, 340/572.4, 572.7, 539.1, 539.11, 539.13, 340/539.19, 539.26, 505, 10.01, 286.02; 381/115; 707/3; 715/745

See application file for complete search history.

(56) References Cited

U.S. PATENT DOCUMENTS

| | | | | |
|---|---|---|---|---|
| 6,144,971 A | | 11/2000 | Sunderman et al. | 715/500 |
| 6,208,264 B1 * | | 3/2001 | Bradney et al. | 340/5.2 |
| 6,308,565 B1 * | | 10/2001 | French et al. | 73/379.04 |
| 6,340,932 B1 * | | 1/2002 | Rodgers et al. | 340/572.7 |
| 6,717,517 B1 * | | 4/2004 | Przygoda, Jr. | 340/572.4 |

FOREIGN PATENT DOCUMENTS

| | | |
|---|---|---|
| EP | 0637807 | 2/1995 |
| EP | 0938036 | 8/1999 |
| FR | 2711001 | 4/1995 |

* cited by examiner

*Primary Examiner*—Van T. Trieu
(74) *Attorney, Agent, or Firm*—Baker Botts L.L.P.

(57) ABSTRACT

A security method including receiving data from devices and normalizing the received data based on uniquely identified objects.

20 Claims, 25 Drawing Sheets

| Employee | Term ID | Category | Date | Time In | Time Out |
|---|---|---|---|---|---|
| John Wey | 001 | Human Resources | 3/1/02 | 8:08 | 8:30 |
| | 004 | Development | 3/1/02 | 9:45 | 10:45 |
| | 004 | Development | 3/1/02 | 11:30 | 11:40 |
| | 002 | E Mail | 3/1/02 | 12:46 | 12:49 |
| | 002 | E Mail | 3/1/02 | 1:15 | 1:17 |
| | 002 | E Mail | 3/1/02 | 2:00 | 2:05 |
| | 002 | Web | 3/1/02 | 2:10 | 2:25 |
| | 002 | E Mail | 3/1/02 | 2:30 | 2:34 |
| | 002 | Web | 3/1/02 | 2:50 | 2:59 |
| | 002 | Web | 3/1/02 | 3:15 | 3:38 |
| | 002 | Web | 3/1/02 | 3:45 | 3:50 |
| | 002 | Web | 3/1/02 | 4:10 | 4:22 |
| | 004 | Development | 3/1/02 | 4:30 | 5:15 |

FIG. 5A

| Employee | Sec. Access | Date | Time | Granted/Denied |
|---|---|---|---|---|
| John Wey | 01 | 3/1/02 | 7:55 | Granted |
| | 04 | 3/1/02 | 8:05 | Granted |
| | 06 | 3/1/02 | 8:35 | Granted |
| | 01 | 3/1/02 | 12:40 | Granted |
| | 03 | 3/1/02 | 12:44 | Granted |
| | 05 | 3/1/02 | 1:30 | Granted |
| | 03 | 3/1/02 | 1:49 | Granted |
| | 04 | 3/1/02 | 4:25 | Granted |

FIG. 5B

Office Equipment Access Log 130

| 132 Employee | 134 Equipment ID | 135 Type | 136 Location | 138 Time | 140 Date | 142 Access Granted/Denied |
|---|---|---|---|---|---|---|
| John Wey | 0042 | Phone | Lab C | 2:15 | 3/01/02 | G |
| | 0042 | Phone | Lab C | 2:22 | 3/01/02 | G |
| | 0042 | Phone | Lab C | 2:32 | 3/01/02 | G |
| | 0041 | Printer | Lab C | 2:45 | 3/01/02 | G |
| | 0060 | Phone | Desk 419 | 9:12 | 3/01/02 | G |
| | 0060 | Phone | Desk 419 | 10:47 | 3/01/02 | G |
| | 0020 | Fax | Mail Room A | 11:43 | 3/01/02 | G |
| | 0060 | Phone | Desk 419 | 12:10 | 3/01/02 | G |
| | 0060 | Phone | Desk 419 | 1:12 | 3/01/02 | G |
| | 0046B | Copier | Copy Room B | 2:15 | 3/01/02 | G |
| | 0060 | Phone | Desk 419 | 3:15 | 3/01/02 | G |
| | 0022 | Fax | Mail Room A | 3:35 | 3/01/02 | G |
| | 0060 | Phone | Desk 419 | 5:15 | 3/01/02 | G |
| | 00247 | Printer | Desk 418C | 5:18 | 3/01/02 | G |
| | 0060 | Phone | Desk 419 | 5:44 | 3/01/02 | G |

FIG. 16

INTEGRATED VISUALIZATION OF SECURITY INFORMATION FOR AN INDIVIDUAL

REFERENCE TO RELATED APPLICATIONS

This present application is a Continuation-in-Part of application Ser. No. 10/751,605 filed Jan. 5, 2004 (Now Abandoned), which is a continuation of application Ser. No. 10/417,731 filed Apr. 17, 2003 (Now Abandoned), which claims the benefit of Provisional application Ser. No. 60,374,471 filed Apr. 18, 2002, and is based on and claims the benefit of Provisional application Ser. No. 60/486,673, filed Jul. 11, 2003, the entire contents of each of which are herein incorporated by reference.

BACKGROUND OF THE DISCLOSURE

1. Field of the Disclosure

The present disclosure relates generally to information security access and in particular, to integrated visualization of security information for an individual.

2. Description of the Related Art

Today the need for institutional security is compelling. Institutional security is necessary to preserve the integrity of corporate secrets that can be critical to the success of the enterprise. Additionally, when an institution deals with classified subject matter, preserving the integrity of institutional secrets can be a matter of national security.

Regulating the activity of people within facilities is a key element of ensuring security. Various types of systems exist for regulating the activity of individuals within a facility. For example, systems exist in which remote badges are coupled to personnel to be located. The badges include transmitters for transmitting identification information identifying the personnel. Receivers spaced throughout a facility are capable of receiving signals from the badges. A central processor is capable of receiving messages from the receivers for determining the location of each of the badges. Using such devices allows for the movements of personnel to be tracked so that the activity of people within facilities can be regulated.

Various types of systems also exist for controlling access to secured areas, including badge reader systems, retina and/or iris scanner systems, finger print scanner systems, etc.

However, all of these monitoring and accessing systems create an immense flow of data. Manually searching through this data can be a daunting task, especially for an enterprise trying to maximize security while subject to tight fiscal constraints. This problem is exacerbated by the fact that the wide variety of security devices and systems implemented by an institution may all use different identifiers for identifying data. For example, a badge reader system might refer to John Smith as badge 12345. A computer operating system might refer to the same person as username jsmith. Therefore it can be exceedingly difficult for monitoring personnel to analyze and make sense of the immense flow of data.

A need exists for a system of monitoring personnel within an environment. More specifically, data concerning the movements of employee personnel should be recorded, organized, analyzed and presented in such a way that security monitoring personnel can be alerted to suspicious behavior, even when such behavior is only identifiable by a small dataset within an immense flow of data.

SUMMARY

A security method including receiving data from devices and normalizing the received data based on uniquely identified objects.

A programmed computer system including a system for receiving data from devices and a system for normalizing the received data based on uniquely identified objects.

A computer recording medium including computer executable code, including code for receiving data from devices and code for normalizing said received data based on uniquely identified objects.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 5A is an example of an IT access log;

FIG. 5B is an example of a physical access log;

FIG. 16 is a block diagram of an office equipment access log;

DETAILED DESCRIPTION

Figure 1A:
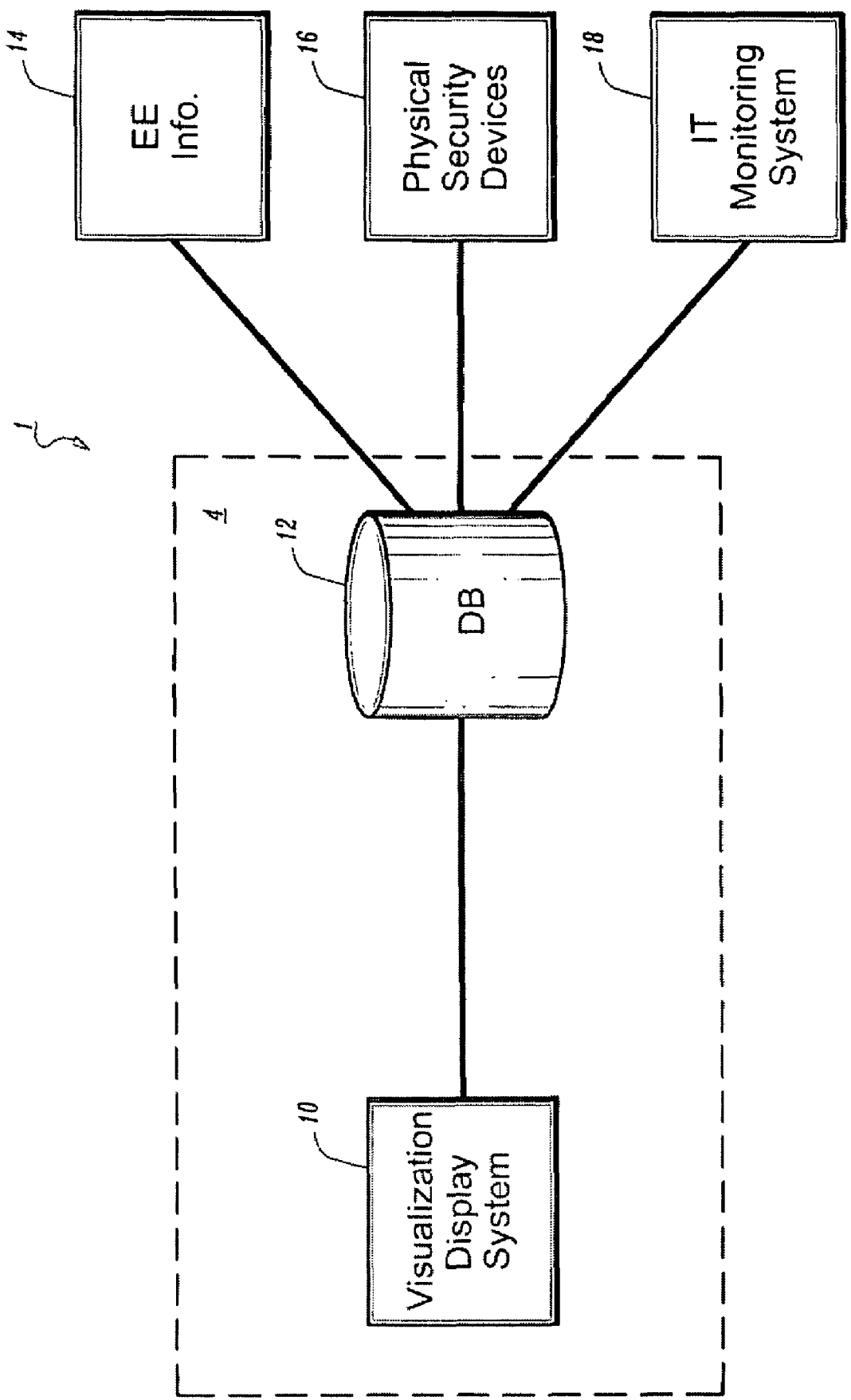
FIG. 1A is a block diagram of a security monitoring system according to an embodiment of the present disclosure.

In describing preferred embodiments of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

FIG. 1A depicts an overall block diagram of a system according to an embodiment of the present disclosure and is referred to generally as security monitoring system 1. Security monitoring system 1 includes a visualization display system 10 and a database 12 which may be located, for example, at a central monitoring station 4. Database 12 may actually be several databases provided at one location or at various locations. Data from database 12 can be accessed, processed and used to construct images displayed on a display associated with visualization display system 10. For example, as will be described on more detail below, various types of security information retrieved from database 12 can be displayed to a user of security monitoring system 1 via visualization display system 10. The visualized data provides a comprehensive and easy to understand visual image of an individual's access history to floors and/or rooms of a building or area. The system may also display various other types of information relating to the individual such as their Information Technology (IT) utilization habits and information relating to their office equipment usage, etc. Various types of security data can be input and stored in database 12, including data from physical security devices 16 and data from IT monitoring system 18. Database 12 may also store employee information 14 such as name, title, date of birth, social security number, phone number, email address and residential address, etc. This employee information may also be displayed by visualization display system 10.

Figure 1B:
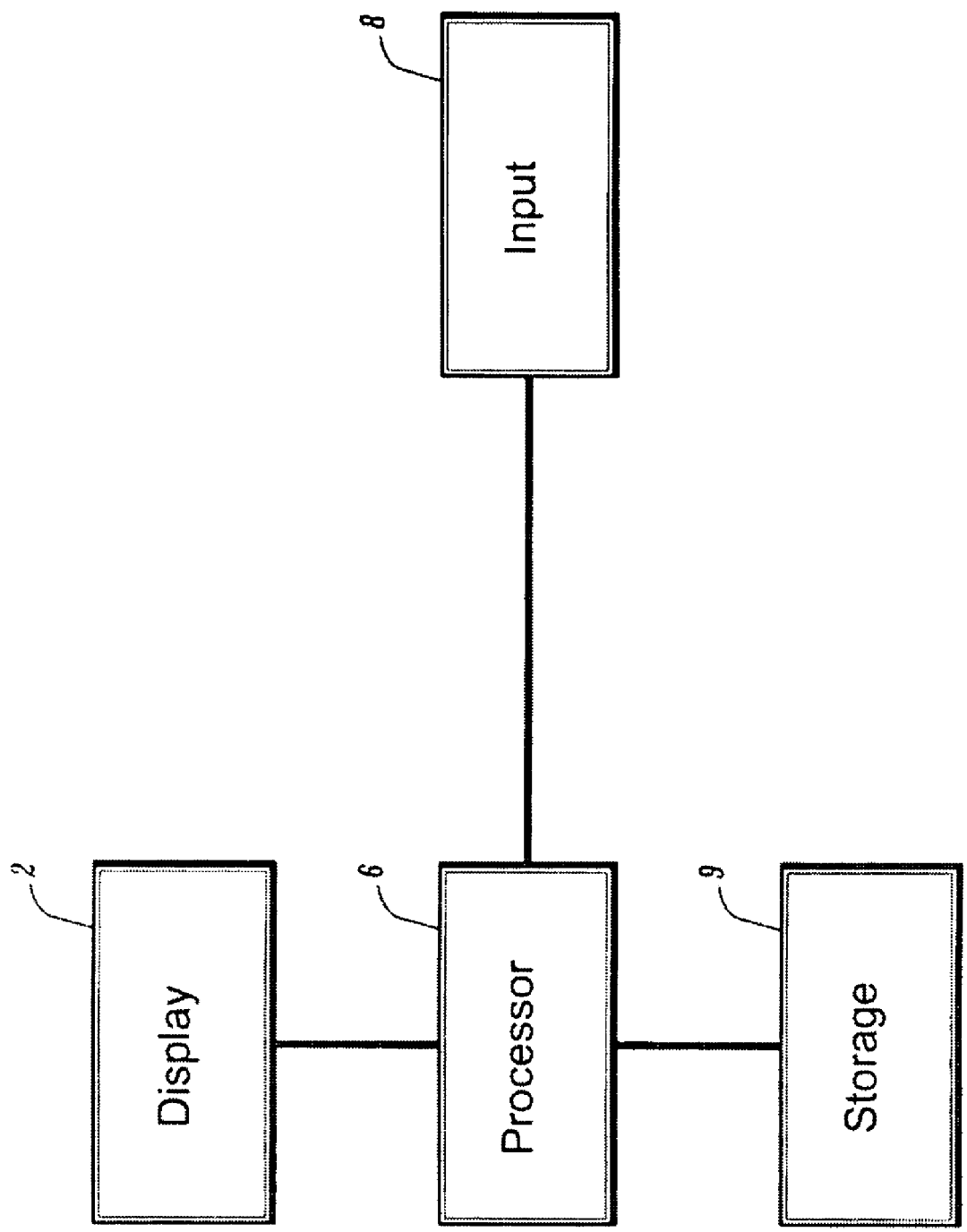
FIG. 1B is a block diagram of a visualization display system according to an embodiment of the present disclosure.

As shown in FIG. 1B, visualization display system 10 may include a display 2, a computer or processor 6, an input device 8 which may include one or more of a keyboard, mouse, etc. and a storage device 9 for storing software including code for implementing the systems described in the present disclosure. Storage device 9 may be internal or external to processor 6. Visualization display system 10 is capable of displaying two and/or three-dimensional images.

A physical security device 16 may be any type of device capable of providing information on the whereabouts of a person. Examples of physical security devices include access point systems that provide secure access to buildings, floors or rooms of buildings, etc. One type of access point system may require a person desiring to enter a building, floor or room of the building to present some type of identification prior to being granted or denied access. Access point systems may include badge reader systems in which an employee, for example, presents a badge prior to being granted or denied access to the building, room or floor. Retina scanners, iris scanners, finger print scanners, face and/or voice recognition, etc. may also be used as effective access point devices for identifying a person prior to granting or denying them access. In its most basic form, an access point system may simply consist of guards positioned at entry points at which a person presents some form of identification prior to being granted or denied access.

Other types of physical security devices include location determining type devices. These types of devices are capable of monitoring the location of individuals. An example of a location determining type device is a face or voice recognition system. In these types of systems, cameras and/or microphones can be installed within rooms of a building. By capturing an image or voice pattern of an individual in the room, the identity of the individual can be determined by comparing the image or voice pattern to a database of known image or voice patterns.

Another location determining type device might include the use of badges equipped with an active or passive circuit. When an individual wearing the badge enters a building, room or floor having an appropriate sensing system capable of sensing the badge, the identity of the individual can be determined. For example, each badge might emit a low power signal, each coded differently for each individual. In this way, each individual can be monitored as they move throughout a building or into and out of specific rooms in the building or area. A Global Positioning System (GPS) might also be used. For example, each employee might be given a GPS receiver and a transmitter which they are required to always have in their possession. The GPS receiver is capable of determining exactly where the employee is in the building. That information can then be automatically transmitted to central monitoring station 4.

Although the present disclosure will be described mainly by reference to the use of badge reader systems, it will be appreciated that any combination of other types of systems including those mentioned above might be used in addition to or as alternatives to the badge reader systems.

Briefly, in a badge reader system, each employee of a company is issued a badge. The badge includes various types of information. For example, the badge might include the employee's name and/or other type of information uniquely identifying the employee (e.g., an employee ID number). A contractor or visitor to the company may be issued a temporary badge uniquely identifying them. The employee's, contractor's or visitor's badge might also include information indicating the various portions of the building or grounds that the person holding the badge has access to. For example, an employee might be given broader access to various portions of the building than a visitor. If a security level system is in place, an employee with a "secret" security clearance might be given broader access to various portions of the building than an employee with a "confidential" security clearance.

The information on the badge might be visible on its face, or it might be stored on the badge electronically on a microchip or magnetically on a magnetic strip. The information might be coded for added security. In the alternative, the various types of access the person can be granted can be stored at one or more remote sites. When a person presents their badge which identifies them in some manner to a badge reader, their access privileges can be retrieved and the person can be granted or denied access accordingly.

Badge readers are located at various entrances to rooms or floors within the building. When the person possessing the badge desires to enter an area, the badge is swiped through the badge reader. The badge reader is capable of reading information contained on the badge. Each badge reader is connected to central monitoring station 4. The connection can be a hard-wire connection, a network connection, a wireless connection, etc. When the badge is read by the badge reader, information is sent to the central monitoring station 4. For example, if the badge contains information indicating the badge holder's access privileges, that information can be sent to the central monitoring station 4. The information can then be compared with that individual's information which is stored in a database accessible by the central monitoring station 4. If the access privileges are confirmed at the central monitoring station 4, confirmation information is sent back to the badge reader system, indicating that access should be granted. The badge holder is then granted access to the area. For example, an electronic deadbolt on a door to the area can be remotely triggered from the central monitoring station 4 or from the badge reader itself. If the individual's badge information can not be confirmed, the individual is denied access to the room. A visual and/or audio indication such as a flashing red light, a buzzer, etc., may be provided on the badge reader to signify that access has been denied.

Another type of badge reader system might store employee access privileges locally, and either grant or deny access to the area based thereon. For example, upon the badge being scanned, the badge reader can access a local or remote database and using the identity of the person as indicated on the badge, determine whether the person identified on the badge should be granted or denied access to the area. If access privilege information is contained on the badge itself, it can be retrieved from the badge by the badge reader and compared to the level of access privileges required to enter that room.

Each badge reader is capable of communicating information to database 12 via a hard wire or a wireless connection. The badge readers may be connected to each other and database 12 via a network. When a person presents their badge to the badge reader to attempt to access the area, the badge reader will send information to the database 12 located at the central monitoring station 4 identifying the room or floor the badge reader controls access to, identifying the person and detailing the date and time that the person was granted or denied access. Database 12 compiles a physical access log of this information for each employee, visitor, contractor, etc. The present disclosure is not intended to be limited to any particular type of badge reader system and the above-mentioned systems are described by way of example only.

Figure 1C:
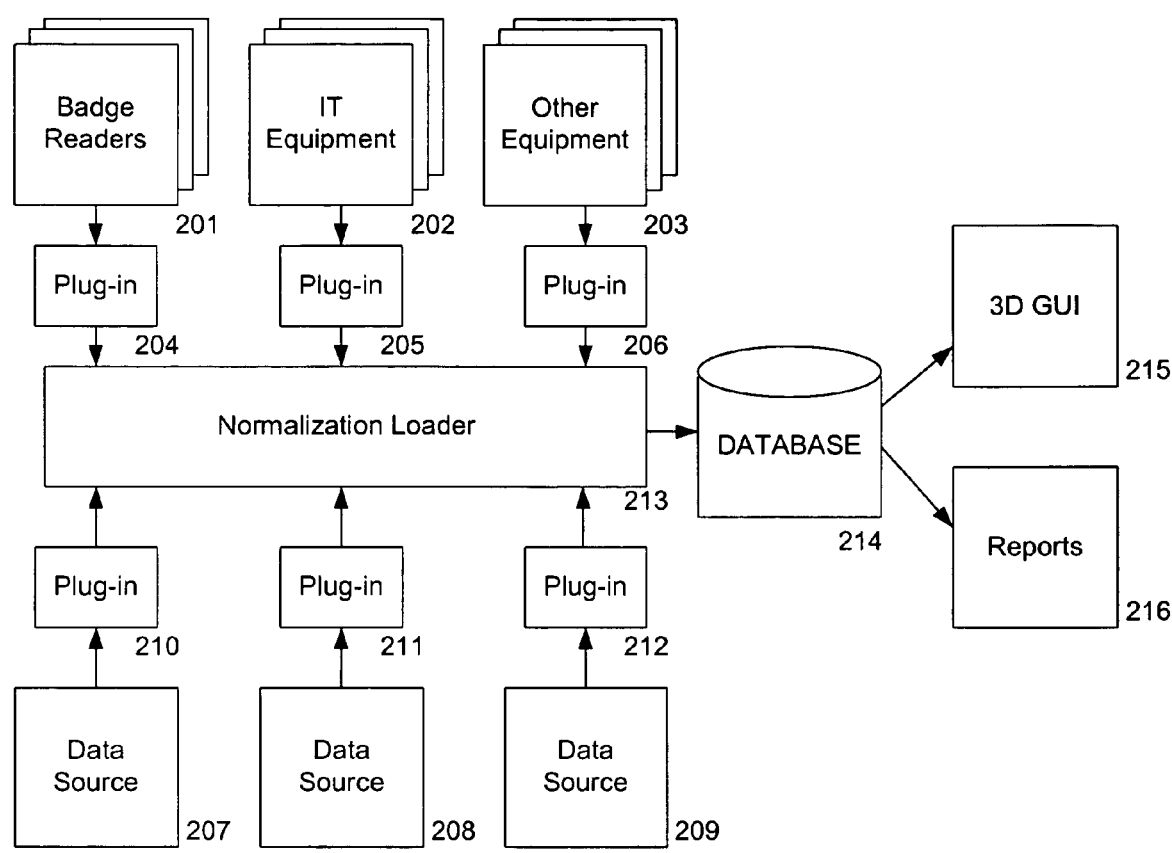
FIG. 1C is a block diagram of a security monitoring system according to another embodiment of the present disclosure.

FIG. 1C depicts an overall block diagram of a system according to another embodiment of the present disclosure. According to embodiments of this security monitoring system, statistical analysis may be performed on the data collected by the physical security devices and the IT monitoring systems. As in the previous embodiment, physical security devices and IT monitoring systems are used to collect data concerning the whereabouts of the individuals within the facility. In this illustration, badge readers 201, IT equipment 202 and other office equipment 203 are used to gather data. Because of the great variety of devices capable of providing information on the whereabouts of a person, each device communicates with the central monitoring station through a plug-in. A plug in is a computer program that enhances a primary program, supplying that primary program with enhanced functionality. Here, the device plug-ins 204, 205 and 206 allow the central monitoring station to interpret data collected from the corresponding physical security devices and IT monitoring systems 201, 202 and 203. In this way, as new physical security devices and IT monitoring systems are connected to the central monitoring station, the central monitoring station will be able to interpret the data from the new devices with the aid of new plug-ins.

As the badge readers 201 register badges, a physical access log of information read from the badge, such as the badge ID and the time, place and disposition of the reading may be sent to the corresponding badge reader plug-in 204. The disposition of the reading may be, for example, whether the person was granted access to the area the badge reader protects. This physical access log is then sent to the normalization loader 213. As IT equipment 202 registers log-in attempts, information such as the user's log-in ID, the computer's ID, the time, place and disposition of the log-in attempt will be sent to the IT equipment plug-in 205. This information is then sent to the normalization loader 213.

Other equipment 203, such as a copy machine, fax machine, telephone, HVAC equipment, etc. may also be used to gather data. When a person desires to use this equipment, that person will be prompted to enter a personal identification number. This number may generally be used to account for the equipment's usage or for billing purposes. However, this number also has security value because it helps to track where a person is and what that person might be doing. This information, in the form of an access log, is then sent to the normalization loader 213 through an appropriate plug-in 206.

In addition to the location and activity information provided to the central monitoring station by the devices 201, 202 and 203, various other external data sources may be used to provide information to the central monitoring station. These data sources are generally databases and computer programs that handle information relevant to security monitoring. For example, ODBC, LDAP, eTrust Audit and XML sources may all be used to provide information. An example would be a personnel database with employee information such as name, title, date of birth, social security number, phone number, email address and residential address, etc. Three example data sources are illustrated 207, 208 and 209.

Like the devices 201–203, each data source may have its own way of collecting and presenting data. For this reason, additional plug-ins may be used so the central monitoring station can interpret information from any source. Three examples of plug-ins are illustrated 210, 211 and 212. Information derived from the data sources is sent to the normalization loader 213.

The normalization loader 213 receives the physical access logs and raw data from the physical security devices and IT monitoring systems 210, 202 and 203 and from the data sources 207, 208 and 209 (see also FIG. 1E, Step S40) and correlates or normalizes this data (Step S42). The data may be correlated according to many different categorizations. For example, the normalization loader 213 (Step S42) identifies unique objects (FIG. 4F, Step S44) and correlates the received data based on these objects (Step S46). A unique object may be, for example, a computer, a badge reader or even a particular person. For example, the normalization loader 213 may receive employee information from a personnel database with the names, personal information and personnel records of all employees located at the facility. The personal information may include badge IDs, computer log-in IDs and copy machine access personal identification numbers. This information is used by the normalization loader to correlate badge reader information, IT equipment information and other equipment information with a particular individual.

The normalization loader 213 functions to take raw data from the various devices and data sources and present usable information pertaining to particular individuals and other unique objects. This information is then stored in a database of normalized information 214.

Normalized information can then be used by the 3D graphic user interface (GUI) to generate the three-dimensional images as described below or to generate reports 216 as described below.

Figure 1D:
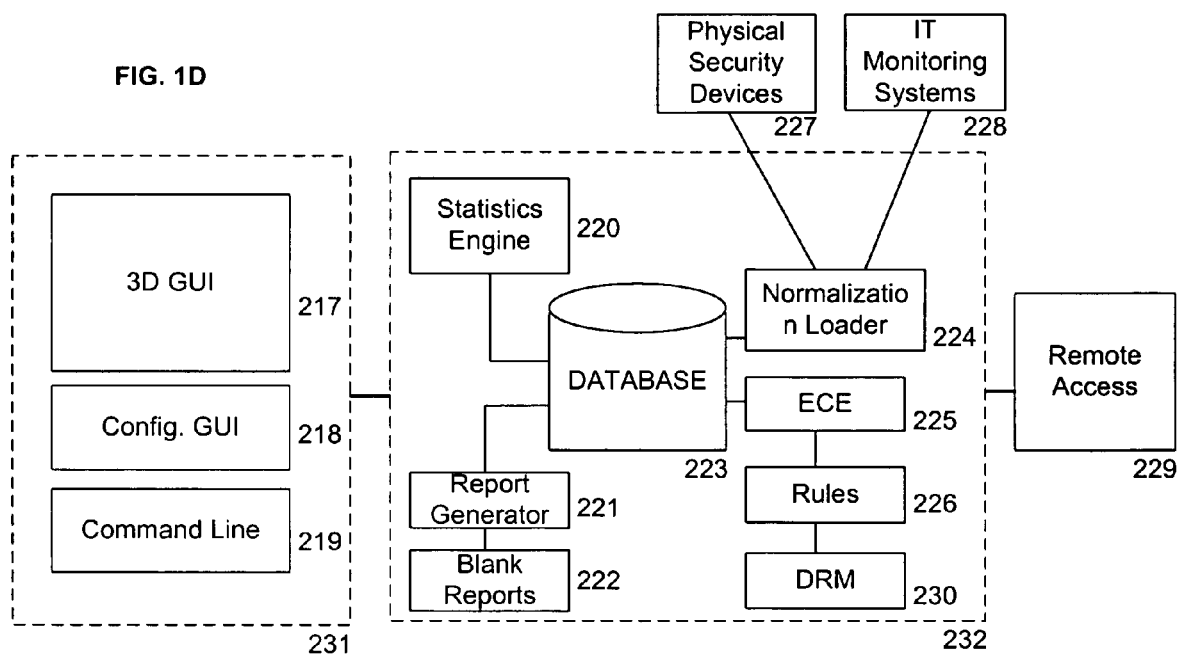
FIG. 1D is a block diagram of another representation of the security monitoring system shown in FIG. 1C.
Figure 1E:
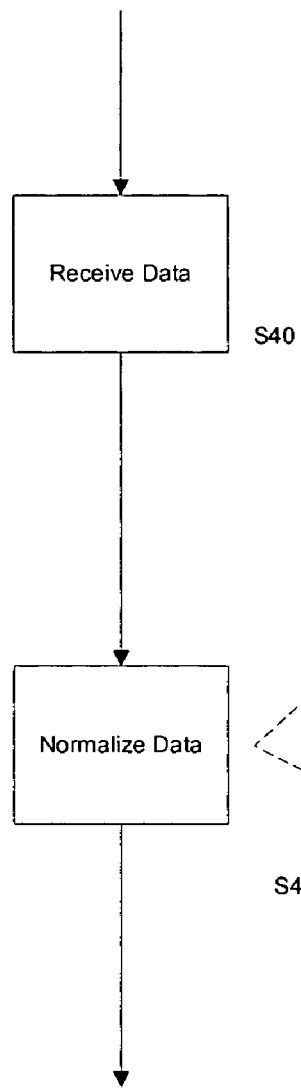
FIG. 1E is a flow chart for describing aspects of embodiments of the present disclosure.
Figure 1F:
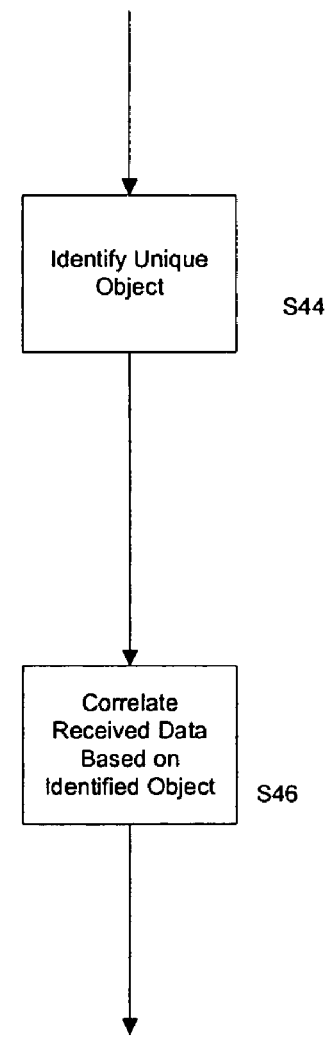
FIG. 1F is a flow chart further detailing one of the steps depicted in FIG. 1E.

FIG. 1D depicts a block diagram of another representation of the security monitoring system shown in FIG. 1C. This block diagram illustrates examples of the ways in which embodiments of the present disclosure may process normalized information stored in the database 223. As illustrated in FIG. 1D, information is collected from multiple sources. In this illustration, these sources are represented as security devices 227 and data sources 228, a simplification of objects 201–212 depicted in FIG. 1C. As illustrated in FIG. 1D, data is collected from the security devices 227 and data sources 228 and sent to the normalization loader 224 for normalization. Normalized data is then stored to the database 223.

The security monitoring system can be programmed to carryout certain jobs. For example, jobs may be scripts that are written to direct the function of the security monitoring system. For example, a job might be created that directs the central monitoring system to collect data as described above, normalize data as described above, statistically analyze data as described below, correlate events as described below and generate reports as described below. Jobs can be entered manually through the command line interface 219 or can be generated by using a job creation wizard.

Normalized information stored in the database 223 can be processed by the statistics engine 220. The statistics engine 220 performs statistical analysis on the normalized data. These statistics are then stored in the database 223 along with the normalized data.

Statistics can be calculated by the statistics engine 220 by statistical grouping. More specifically, statistics can be grouped by person, or by machine. Statistics calculated may include event totals (the number of times an event occurs) and event frequency (the number of times an event occurs within a set time period).

One example of a statistic that can be calculated by the statistics engine 220 is the start of day statistic. This statistic represents the time of the first security event of a day associated with a particular person. This security event may be, for example, the person swiping his or her badge through a badge reader as he or she enters the building. The start of day statistic is averaged over a period of time to determine the mean start of day statistic. Additionally the standard deviation may be calculated.

Another example of a statistic that can be calculated by the statistics engine 220 is the end of day statistic. This statistic represents the time of the last security event of a day associated with a particular person. This security event may be, for example, the person swiping his or her badge through a badge reader as he or she exits the building. The end of day statistic is averaged over a period of time to determine the mean end of day statistic. Additionally the standard deviation may be calculated.

Another example of a statistic that can be calculated by the statistics engine 220 is the rate per user per day statistic (user statistic). This statistic is the total number of times a particular security event has occurred for a particular person for that day. For example, this statistic might be used to track the number of failed computer logins. The mean and standard deviation of this statistic may be calculated as well. These statistics can be calculated per hour as well.

Another example of a statistic that can be calculated by the statistics engine 220 is the rate per day per machine statistic (machine statistic). This statistic is the total number of times a particular security event has occurred for a particular machine for that day. The mean and standard deviation of this statistic may be calculated as well. These statistics can also be calculated for particular days, for example for Mondays, for weekdays and for weekends. These statistics can be calculated per hour as well.

Normalized information and statistical information can be analyzed by the event correlation engine (ECE) 225. The ECE 225 compares this information against defined rules 226 to ascertain when these rules 226 have been broken. Rules 226 may be predefined or may be custom built. Existing rules 226 may also be modified. A dynamic rule manager 230 can be used to aid in the creation and modification of rules 226.

Rules may be used to compare normalized information against statistics or statistics against statistics and determine if the difference is within an acceptable level. For example, a rule may be that every employee's start of day statistic must be within two standard deviations of that employee's average start of day statistic for the past month. Another rule may be that no employee may have more failed login attempts than two standard deviations above the average number of failed login attempts for all employees for the past month. Such rules would be useful in determining if an employee has substantially deviated from that employee's general routine or if that employee's general routine substantially deviates from the average routine of all employees, activities that might be considered suspicious. The particular job being run will determine what statistics are used and what rules are applied.

An instance of a broken rule is considered an anomaly. Rules are designed so that anomalies correspond with suspicious behavior. Anomaly information may be stored in the database 223 along with the normalized information and the statistical information. The job may dictate that anomalies automatically trigger the generation of an audit message. The job may also dictate that reports be generated.

Reports are tables of information that can be read to alert security monitoring personnel about suspicious behavior. Blank reports 222 are predefined templates for constructing a report. Normalized information, statistical information and anomaly information is read from the database 223 by the report generator 221. The report generator 221 uses the input data to fill out the blank reports 222 requested by the job. The generated reports can be printed, displayed and written to the database 223. For example, a report might list all anomalies and provide the personal information of the employee who has triggered the anomaly. Reports can also be generated to show job status, for example the status of jobs that are currently running or have been completed.

Five principal examples of types of reports include current investigation reports, event reports, job reports, anomaly reports and statistical reports. Other types of reports may be used as well. Current investigation reports can be formed when an investigation has been created or opened. An investigation is a job that relates specifically to collecting and analyzing data relating to a particular person or device. Current investigation reports display information pertinent to the currently running or open investigation. Event reports report information about events arranged by machine, person, building and anomaly. Job reports list all of the jobs defined in the system. This report may also provide the start time, the number of times the job repeats, the delay between repetitions and the state of the job currently running. An anomaly report shows all anomalies detected and the pertinent information for each anomaly. Statistic reports contain averages and standard deviations of the normalized data collected.

The security monitoring system according to an embodiment of the present disclosure may be organized into three separate sections. The security monitoring system server 232 contains the database 223 and all of the various engines discussed above. The security monitoring system server 232 is also responsible for processing jobs and generating reports. The security monitoring server 232 can be monitored and controlled locally through the graphical user interface (GUI) 231. Within this GUI, a 3D GUI 217 is used to depict three-dimensional images as discussed below. A configuration GUI 218 is used to assist in the creation and editing of jobs, the setting of rules and the creation and editing of blank reports. A command line user interface 219 is also available for instantly monitoring and directing the operation of the security monitoring system. This command line user interface 219 can also be used to perform additional specialized operations. The security monitoring system server 232 can also be controlled and monitored through remote access 229. By using remote access, security management personnel can monitor the operation and results of the security monitoring system from a remote computer, for example over a secure internet connection. The remote access 229 can also be in the form of an email or page alerting security monitoring personnel when particular anomalies occur. Remote access 229 can additionally be used to automatically commence security measures, for example, restricting the access privilege of a particular employee when a particular anomaly has been observed.

Figure 2:
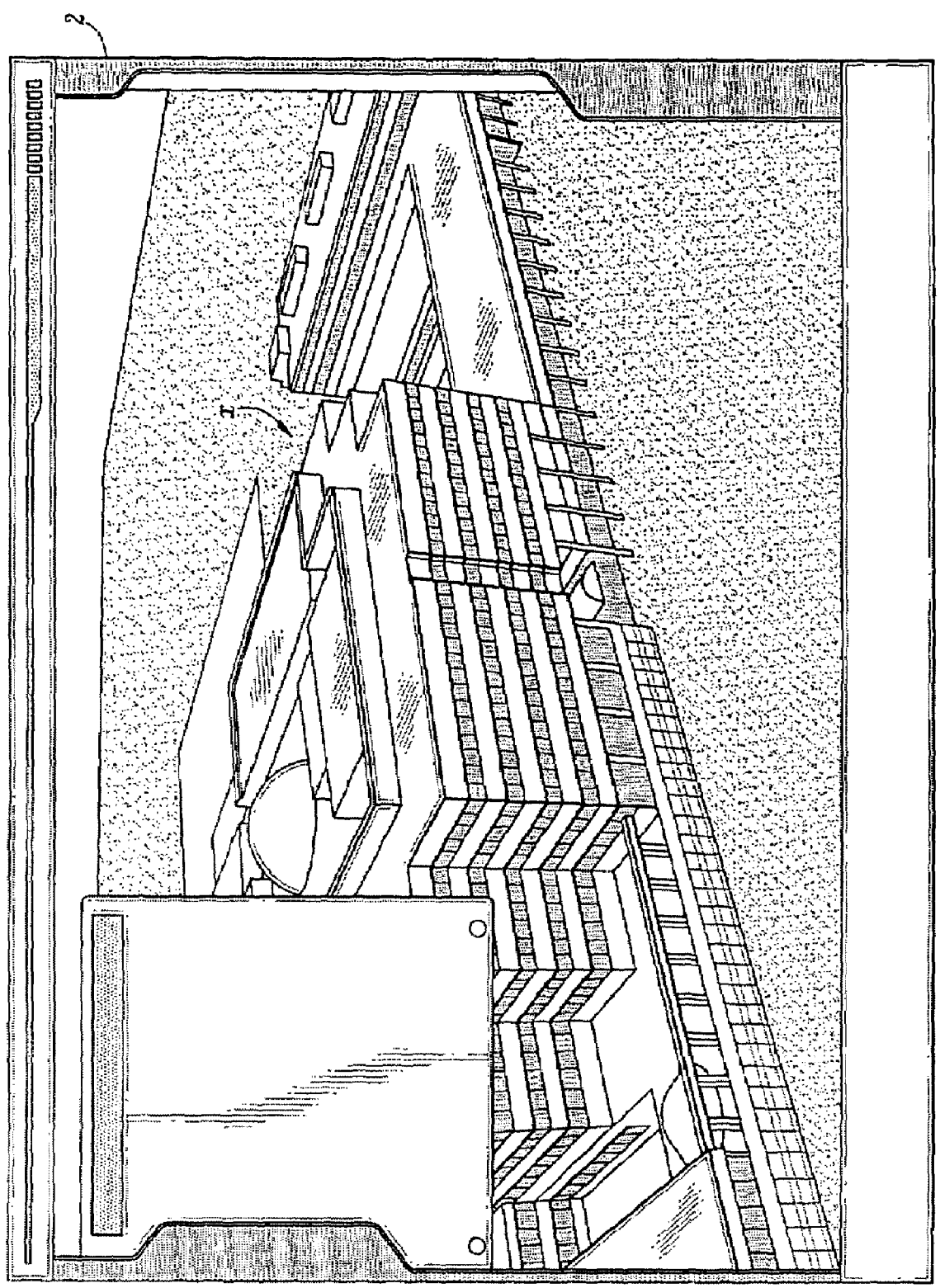
FIG. 2 shows a three-dimensional display of an image of a building.
Figure 3:
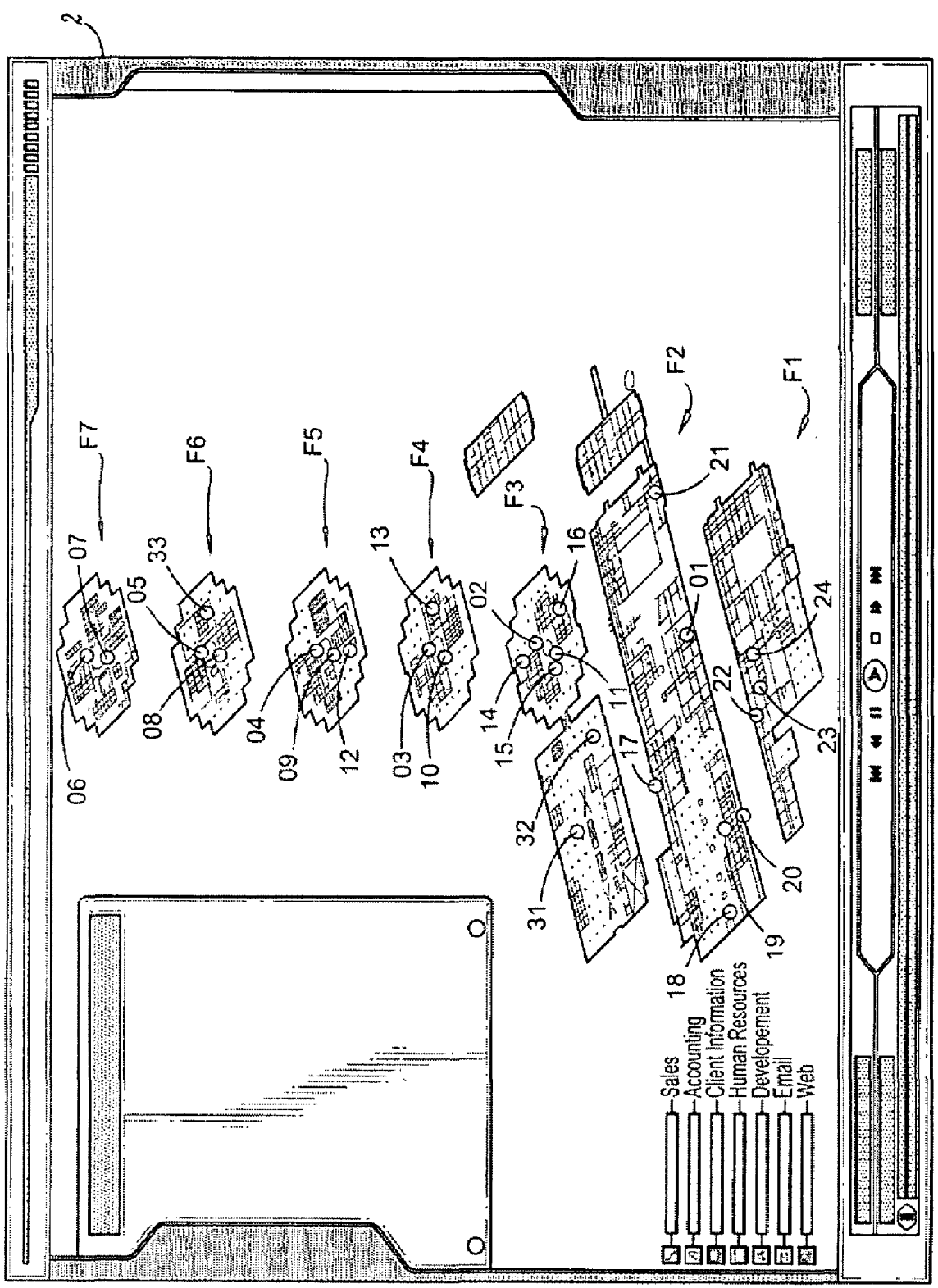
FIG. 3 is a three-dimensional display of an exploded floor plan of the building shown in FIG. 2.

FIG. 2 depicts a three-dimensional image of a type of environment to which the present system and method may be applied. In this example, the environment is a corporate headquarters building X. A three-dimensional image of the corporate headquarters building can be displayed on display terminal 2 of visualization display system 10 (the 3D GUI 217). Double clicking on the building X, presents a three-dimensional floor plan of the building X, as shown in FIG. 3. The building has multiple floors F1–F7. Each floor might have multiple rooms, as shown. Depending on the desired security in the building, various type of physical security devices might be provided in the building. For example, the white dots labeled 01–24 represent security access points in the building. In the following description these security access points are described as badge reader type systems. However, as mentioned above, it will be appreciated that various other types of systems might also be used. As shown, the security access points are specific locations in the building, usually entrances to a floor or room, at which each person must be cleared prior to entering that floor or room. For example, security access point 01 is a badge reader located at the main entrance on floor F2 of building X. Floor F2 is the main floor of the building and also includes entrance security access points 17, 18 and 20. In addition to entrance access points 01, 17, 18 and 20, main floor F2 may include access points 19 and 21 for gaining access to specific rooms on floor F2. When an employee, for example, enters the building or room at one of these access points, they are required to present their employee badge at the badge reader station. The badge reader will automatically send information to central monitoring station (database 12) to create a log (a "physical access log") of information identifying the employee, the security access point and indicating the date and time that the employee entered through that access point.

As shown in FIG. 3, floor F3 has security access points 02 and 11 so that when a person exits the elevator at that floor, they are required to present their badge to gain access to the floor. Floor F3 also includes security access points 14–16 for gaining access to specific rooms on that floor. Each floor and each room on a floor having a security access point might require a different level of security access clearance for gaining access. Floor F3 might also have location determining devices 31 and 32 for sensing a unique signal being emitted from each employees badge. When an employee possessing such a badge enters that portion of floor F3, the badge is sensed by one of devices 31 or 32, and information can be sent to the central monitoring station database 12 identifying the individual. This information as well as the date and time of the identification can be added to the physical access log of information for that employee. Floor F4 includes security access points 03 and 10 for gaining access to floor F4 and access point 13 for gaining access to a room on that floor. Floor F5 includes access points 04 and 09 for gaining access to floor F5 and access point 12 for gaining access to a room on that floor. Floor F6 includes access points 05 and 08 for gaining access to floor F6. Floor F6 also includes a voice recognition system 33. When an employee is in that portion of floor F6 and speaks, system 33 will capture the voice pattern and use it to determine the identity of the individual from a database of voice patterns. Appropriate information can then be sent to central monitoring station database 12 identifying the individual as well as identifying where and when the individual was detected. Floor F7 includes access points 06 and 07 for gaining access to floor F7. Floor F1 includes access points 22–24 for gaining access to rooms on that floor.

Although depicted as three-dimensional images, it will be appreciated that the building and/or floors could also be depicted in two-dimensional form or in a combination of two and three-dimensional forms. For example, the system may be arranged so that the floors are originally displayed in three-dimensional form as shown in FIG. 3. If the user desires to view a particular floor in more detail, the user clicks on the floor, and a two-dimensional image of the floor plan is displayed. The same information displayed on the three-dimensional image can also be displayed on the two-dimensional image.

In addition, although all floors are shown as being displayed on display 2, it will be appreciated that not all floors may be displayed at once. For example, zoom in and zoom out controls may be provided, allowing the user to zoom in and out on floors which are of particular interest, providing the user with a more detailed floor plan and view as the user zooms in. In addition, the system may be arranged so that a floor is not displayed or is dimly displayed until it is required to show an access on that floor. In this way, extraneous information (e.g., floors that have not been accessed) need not be displayed, providing an even clearer picture for the user.

As shown in FIG. 1, database 12 may also collect and store information from IT monitoring system 18 for creating the IT assets logs. Companies today often us some sort of system for collecting enterprise-wide security and system audit data from various portions of their IT system assets including UNIX, Windows NT and 2000, Web servers, mainframe systems, etc. This makes it possible to collect and store information regarding the usage of these assets. The company can thus have easy access to information for reporting and detecting unusual or malicious activities on the system. For example, a company might have different departments with particular IT assets being accessible only by employees in those departments. For example, a company's IT assets might be categorized as Sales, Accounting, Client Information, Human Resources, Development, Email, Web, etc. Each category of IT assets might normally only be accessible to certain individuals. When an IT asset is accessed or attempted to be accessed by an employee, information identifying the person attempting the access as well as the category of the access can be stored, for example, in database 12. In this way, a log can be maintained indicating which assets or categories of assets each employee normally accesses during the course of a day. This information can be useful in identifying when an employee strays from their normal accesses as will be described later below.

The IT asset information might also be used to provide additional information for the physical access log. For example, when an employee logs onto a terminal, information identifying the terminal (and/or terminal's location) and information identifying the employee can be sent to the central monitoring station 4 to be stored in the employee's physical access log.

Figure 4:
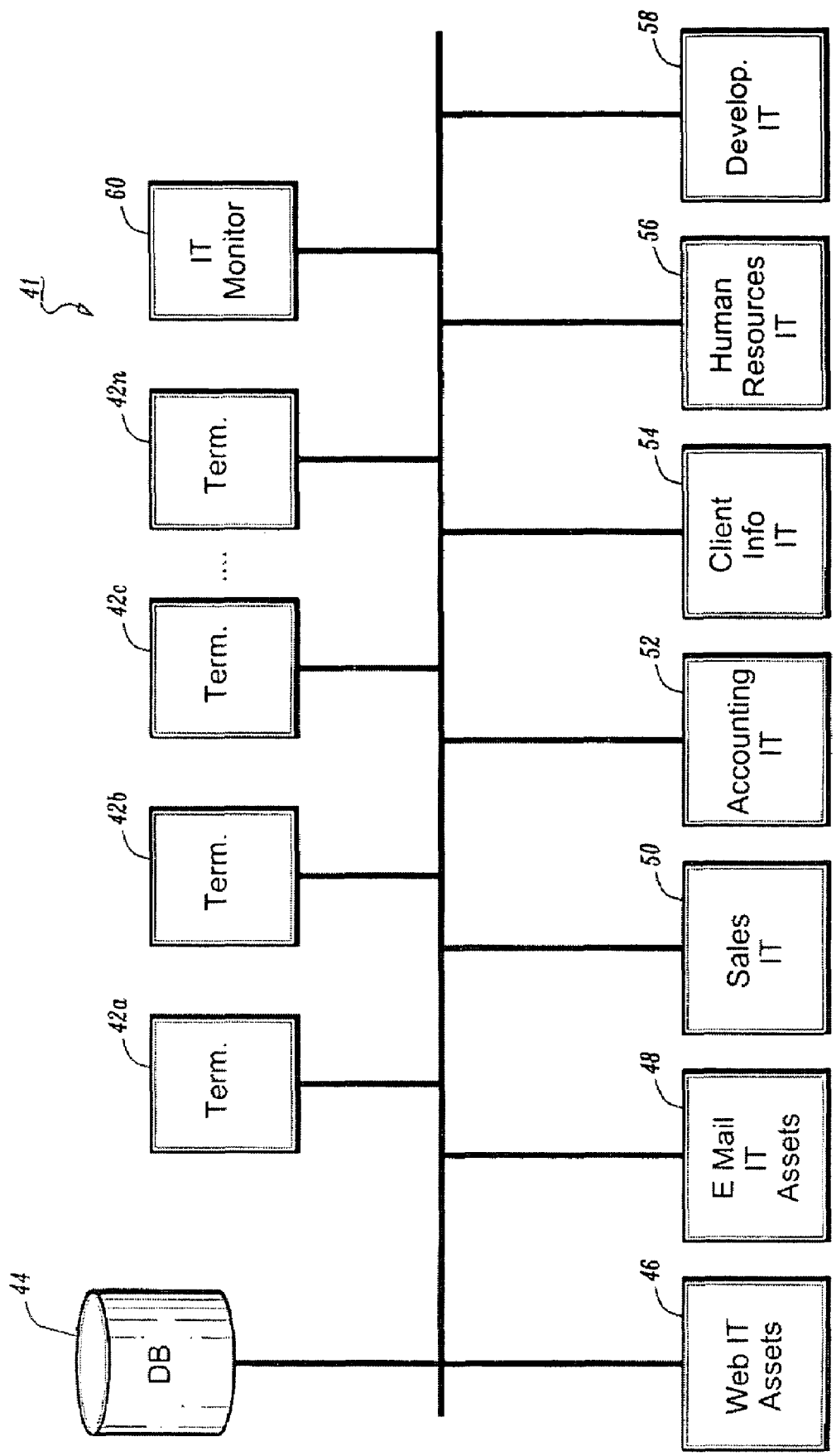
FIG. 4 is a block diagram of an Information Technology system.

An example of a company's IT system 41 is shown in FIG. 4. The IT system includes one or more networks 40. Computer terminals 42a–42n may be provided throughout various rooms in the building. The terminals 42a–42n may be connected to the network 40 via, for example, a hard wire and/or a wireless connection. Also connected to the network are one or more databases 44. One or more Web IT Assets 46 such as, for example, web servers and one or more Email IT assets 49 such as email servers may be provided on the network, allowing employees access to the Internet and their email. Various types of Sales IT assets 50 might also be provided. For example, the Sales IT assets might include servers, databases, specific applications, etc. dedicated to usage by those employees in the sales department. Various types of Accounting IT assets 52 might be dedicated to usage by those employees in the accounting department. Client Information IT 54 might include one or more databases storing information on each corporate client. Client Information IT 54 might normally only be accessible by members of senior management. Human Resources IT assets 56 might include servers, databases, applications, etc. specific to the human resources department and accessible by only those employees in that department and managers of other departments. Development IT assets 58 might include servers, databases and applications for use by the development staff.

The IT system 41 may have one or more ways of granting usage rights to an employee. For example, each employee might have a password which they enter at a terminal prior to being granted access to the network 40. IT monitor 60 monitors the network and maintains a log of the usage of the various IT assets by each employee. For example, the IT monitor 60 may provide information identifying the terminal an employee has used to log onto the network and detailing the date and time that the employee was granted or denied access to the network. This information (IT access log) might include how long the employee was logged onto the computer terminal or network, etc. as well as information identifying what category of IT assets were accessed.

Examples of portions of an IT access log and a physical access log are shown in FIGS. 5A and 5B, respectively. These IT access logs and physical access logs can be collectively referred to as security access history information. As shown in FIG. 5B, on Mar. 1, 2002, employee "John Wey" entered the building at 7:55 am using the main entrance security access point 01 (see FIG. 3). At 8:05 am, the employee was then granted access to floor F5 via security access point 04. As shown in FIG. 5A, it can be seen from the IT logs the employee then used a computer terminal having terminal ID 001 to access an IT asset categorized as Human Resources. The asset was accessed from 8:08 am to 8:30 am. The employee was then granted access to floor F7 via security access point 06 (see FIG. 5B) at 8:35 am. The employee then accessed a Development IT asset using a terminal having a terminal ID 004, between 9:45 am and 10:45 am and again between 11:30 am and 11:40 am. At 12:40 pm, the employee again entered the building using the main entrance security access point 01, perhaps returning from lunch. At 12:44 pm, the employee was granted access via security access point 03, to Floor F4. Between 12:46–12:49 pm and between 1:15 and 1:17 pm, the employee logged on via a terminal having a terminal ID 002 and used the email IT assets, to perhaps access or send email. At 1:30 pm, the employee used security access terminal 05 to enter floor F6. At 1:49, the employee used security access terminal 03 to again enter floor F4. The employee then accessed the email assets from 2:00–2:05 pm and again from 2:30–2:34 pm using the terminal having terminal ID 002. The employee also accessed the Web server assets from 2:10–2:45 pm, from 2:50–2:59 pm, from 3:15–3:38 pm, from 3:45–3:50 pm and from 4:10–4:22 pm, all of these accesses being performed using a computer terminal having a terminal ID 002. At 4:25 pm, the employee used security access point 04 to access floor F5. From 4:30–5:15 pm, the employee assessed development IT assets using terminal 004. There are no more log entries for that day, indicating that the employee likely left for the day.

Although shown herein as separate logs, it should be understood that the security access history information might actually consist of one log chronologically showing an employee's physical accesses as well as their IT accesses.

Although it may not be too difficult to review these logs to determine where an employee was and what they were doing for any given day, it would be extremely time consuming and burdensome to view the logs in this manner over the course of a month or even a week. It would be even more burdensome to find patterns in the employee's movements and actions and to locate deviations in those patterns that might indicate that the employee was up to no good. The present system presents this information in a visual display that shows the employees movements throughout the building over the course of a set period of time, so that those movements can be easily tracked and analyzed. A visual display is also provided depicting the employee's IT access for any period of time, providing additional key information regarding the employee.

The present system thus provides a way of effectively tracking employee movement through the building and/or usage of the company's IT systems. When an employee is under suspicion for some activity, perhaps because that employee's actions have triggered an anomaly, or simply as a matter of a routine check, security personnel can retrieve the employee's security history information and the information can be displayed in an easy to understand visual format.

Figure 13:
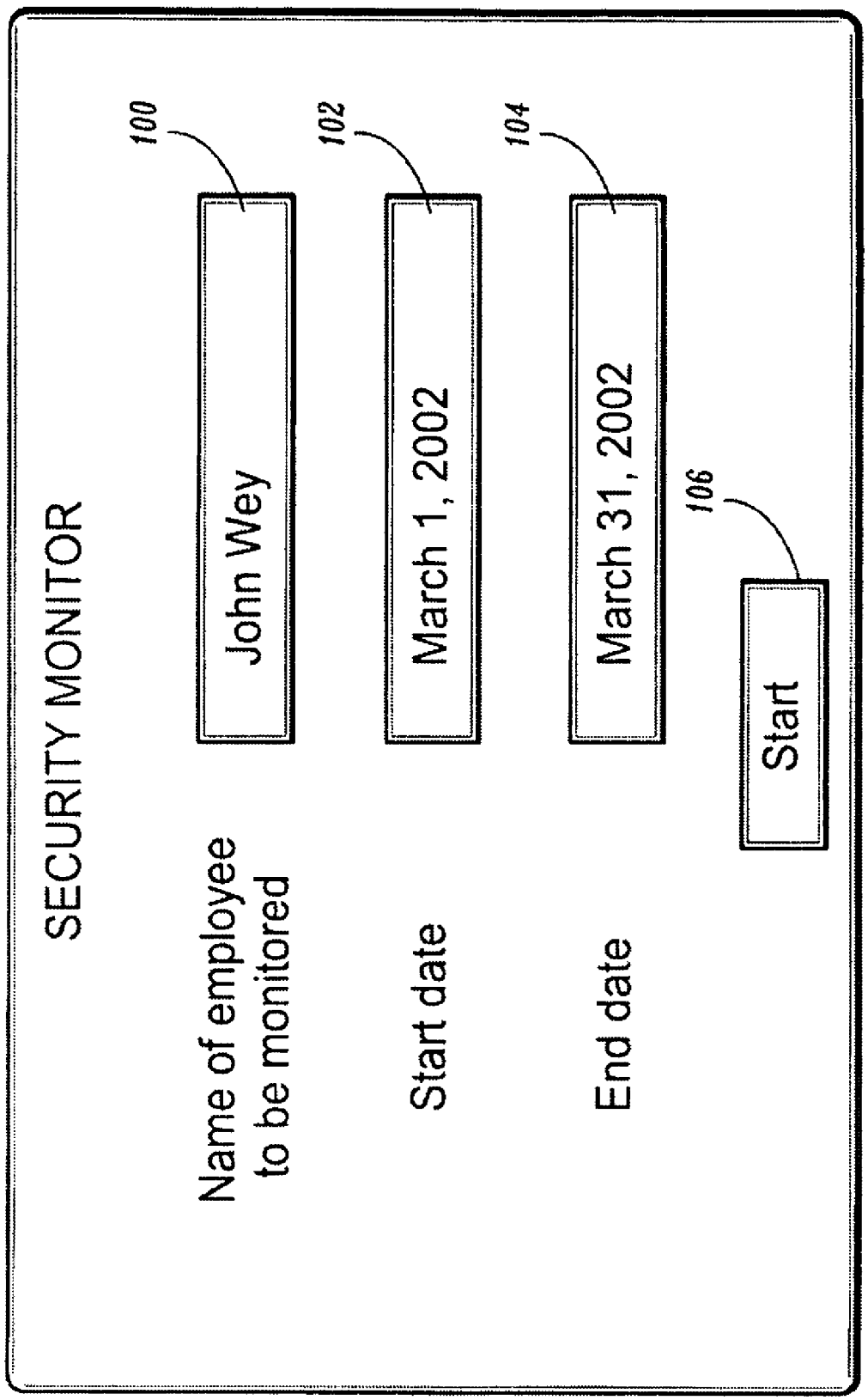
FIG. 13 is a graphical user interface.

When the system is started, the user (e.g., a security manager) is presented with a graphical user interface (GUI), as shown in FIG. 13, requesting the user to input various types of information. For example, GUI may be displayed on display 2 of visualization display system 10. The user is requested to input the name of the employee they wish to investigate in box 100 ("John Wey"). The user is also requested to input the starting date in box 102 ("Mar. 1, 2002") and the ending date in box 104 ("Mar. 31, 2002") of the period of time the user desires to view. After the user is satisfied with these entries, the user then clicks on the START button 106. In response, the system retrieves the employee's security access history from the database 12 for that period of time, so that the information can be displayed on an easy to comprehend intuitive display format.

Figure 6:
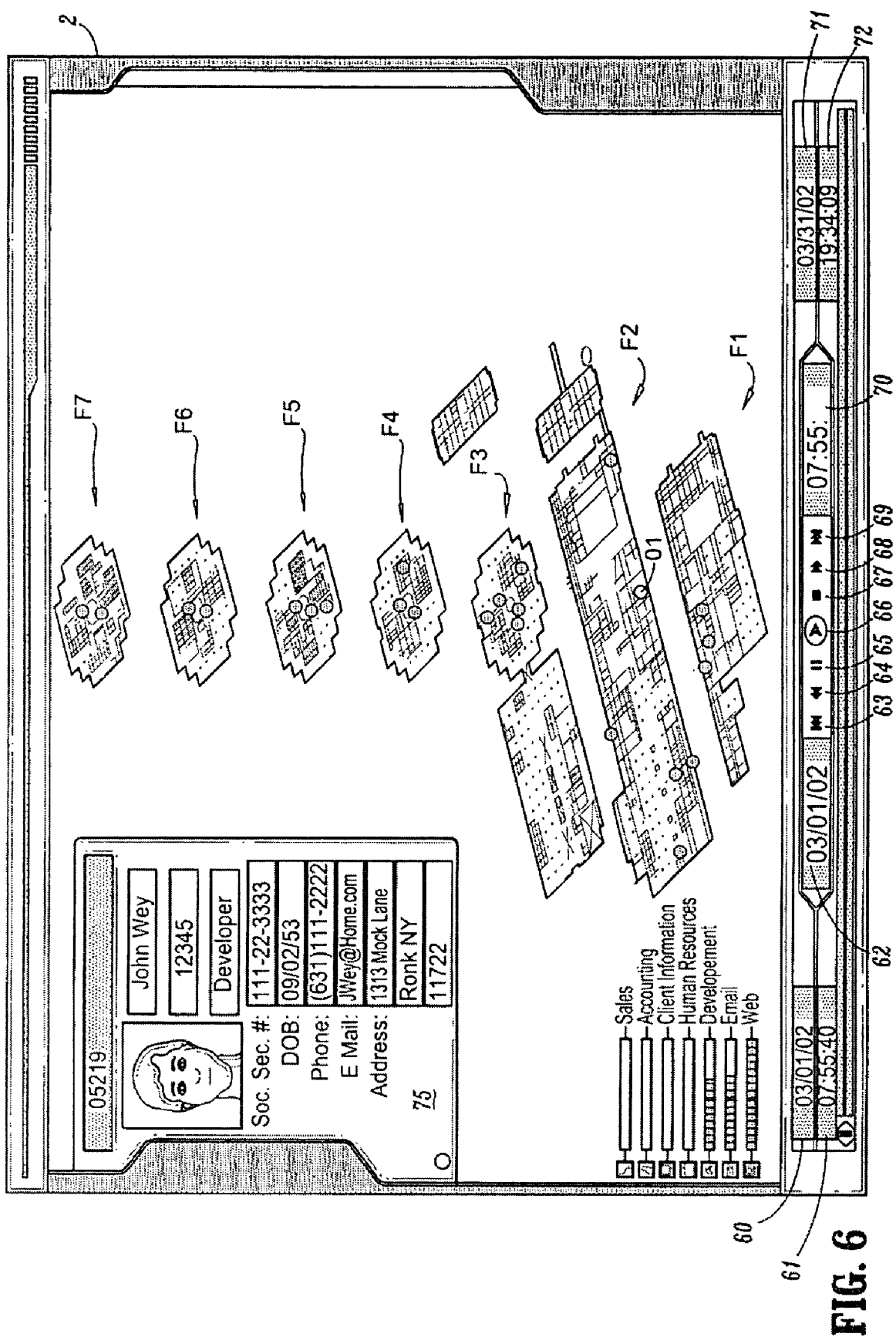
FIGS. 6–12 are various displays that can be presented to users of the present system.

The various types of information, including generated reports, information from the physical security devices 16, the IT monitoring system 18 and the employee information 14 can be presented to the use in a display as shown in FIG. 6. The system presents the physical security access information chronologically as a series of images, presenting the employee's access paths through the building. The display can be controlled using VCR type controls. At the bottom of the display are the video controllers allowing the user to scan forward or backward in time to observe employees movements throughout the building over the course of days, weeks, months, etc. Box 60 displays the earliest date for which log information is to be displayed. In this case, Mar. 1, 2002 was entered by the user. Box 61 displays the time of the first physical security log entry occurring on March 1. A user can also modify the earliest date and time by placing the curser in box 60 or box 61 and typing in the earliest date and time desired. Box 71 displays the end date input by the user. In this case, Mar. 31, 2002 was entered by the user. Box 72 displays the time of the last physical security log entry occurring on March 31. A user can modify the last date and time by placing the curser in box 71 or box 72 and typing in the last date and time desired. The times may be displayed in military time or in ordinary time. Box 62 displays the date and box 70 displays the time currently being displayed. Clicking on fast rewind button 63 rewinds the display in one day increments. Clicking on rewind button 64 rewinds the display in hourly increments. Clicking on button 65 pauses the display. Clicking on button 66 starts the display moving forward and clicking on button 67 stops the display. Clicking on button 68 forwards the display in hourly increments. Clicking on button 69 fast forwards the display in daily increments or it can be used to fast forward the display between anomalies. Also shown on display 2 is a window 75 having personnel information pertaining to the employee being investigated. The information may include the employee's picture, name, employee identification number (12345) and title (Developer). The information might also include the employee's social security number, date of birth (DOB), home phone number, email address and their contact address where they can be reached.

Figure 7:
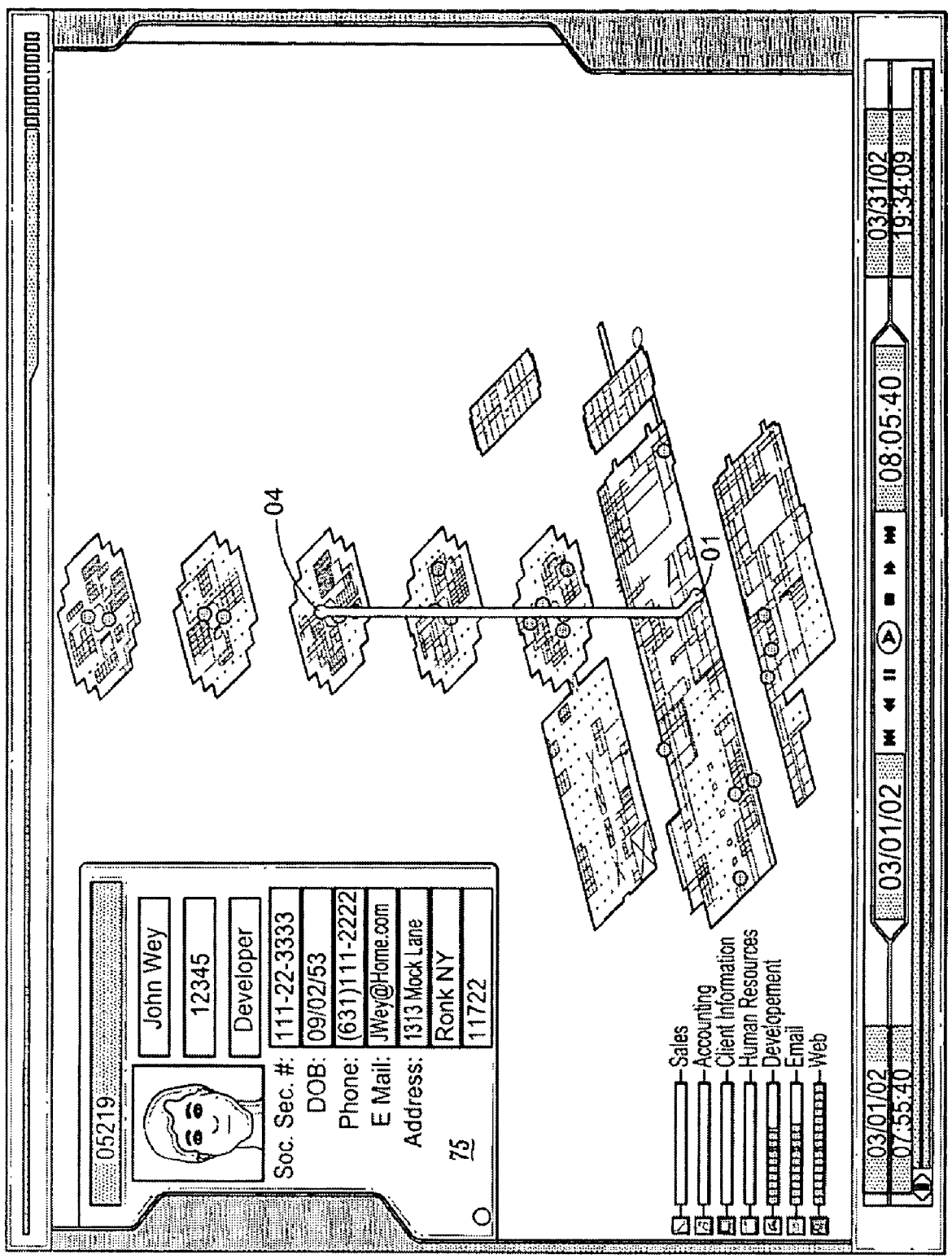
Figure 8:
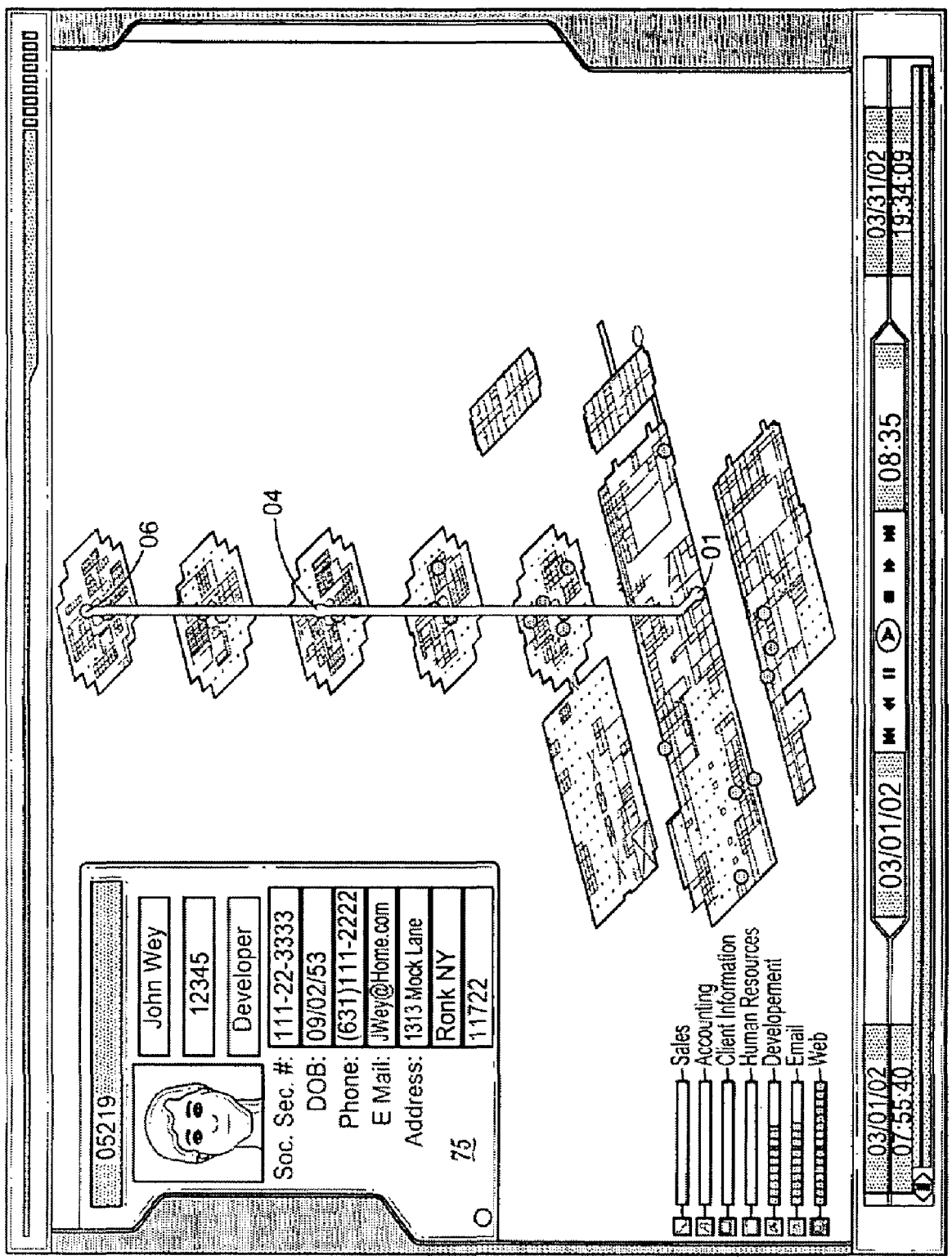

As shown in FIG. 6, security access point 01 is highlighted indicating that the employee entered the building at this point on Mar. 1, 2002 at 7:55 am (also see FIG. 5B). As shown by the physical security log in FIG. 5B, the employee then entered floor F5 at 8:05 am using security access point 04. The display thus changes to the display as shown in FIG. 7, highlighting a path extending from point 01 to point 04. The employee then entered floor F7 at 8:35 am using security access point 06. The display thus changes to the display as shown in FIG. 8, highlighting the path extending from point 04 to point 06. This continues for each of the physical security access points, until the user stops the display by clicking on stop button 67 or the end of the period to be displayed has been reached (Mar. 31, 2002). The display automatically highlights the employee's routes or paths through the building incrementally, hour by hour, day by day, showing the paths that the employee follows. Eventually, as the system determines that a path is routine, that path will be faded out, so that only paths which are out of the ordinary are highlighted. In this way, the user can quickly determine where the employee has strayed from his ordinary course of travel throughout the building.

The system can use default values or user set values to determine when to fade out a path. For example, a fade value might be set to 10, indicating that if the same path occurs more than ten times over the course of the period of time being examined, the path will fade. A GUI can be provided, so that this value can be increased or decreased by the user as desired. The actual fade might occur gradually. For example, as a path occurs more often, it will gradually fade more and more. As an alternative to fading paths that occur more often, other visual indications might be used. For example, the paths might begin as one color and as the path occurs more and more often, the color might change to another color or to different colors, depending on how often the path has occurred. A color key can be provided at the bottom of the display, indicating what each color means.

While showing the path that the employee follows, anomalies that have been detected can be depicted. For example, an anomaly generated when an employee was repeatedly denied access to a particular area can be illustrated by a specific color or shape superimposed onto the shown path.

Figure 9:
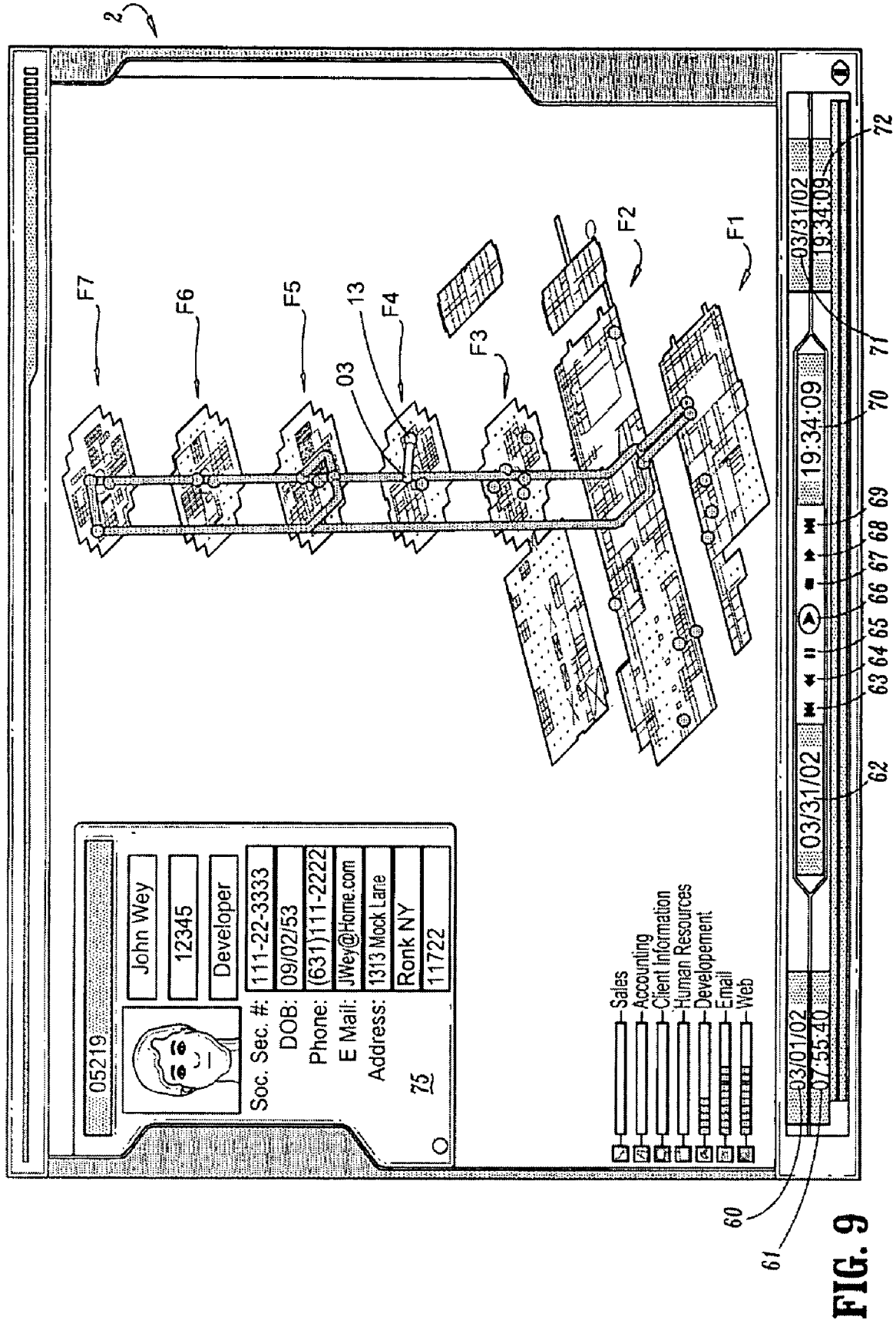

Displayed in the lower left-hand corner of display 2 is a visualization of the employee's IT access history showing the categories of IT assets the employee accessed during the course of the day. For example, as shown in FIG. 9, on March 31, the employee did not access the Human Resource, Accounting, Client Information or Sales IT assets. However, the employee did access the Web IT assets and Email IT assets and to a lesser degree, the Development IT assets.

Figure 10:
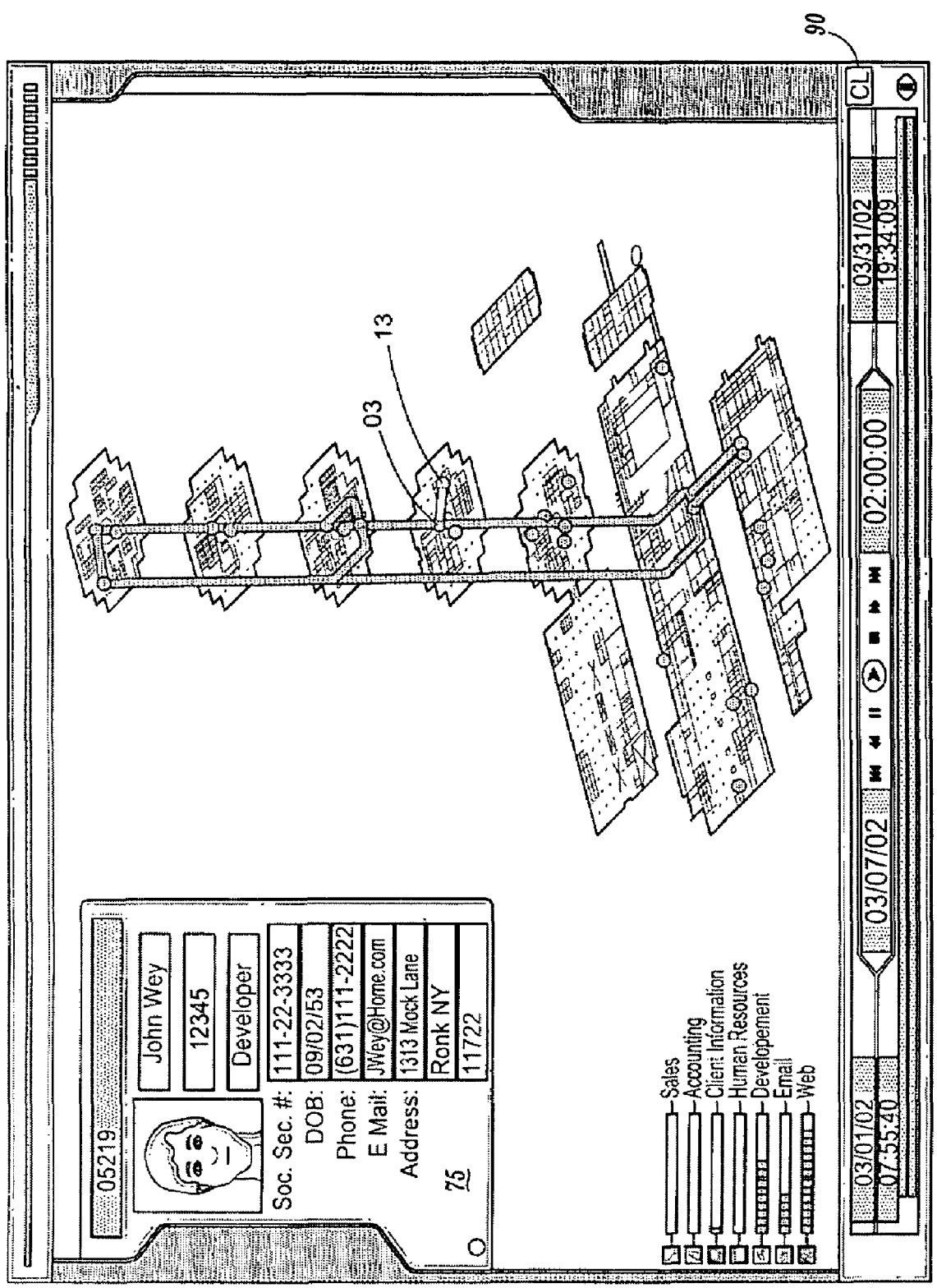

Let's assume that after the month of data has been displayed, it is seen that one path is highlighted, indicating that an anomaly has occurred in the employee's movements. For example, as shown in FIG. 9, the path from security access point 03 (floor F4) to security access point 13 is highlighted. In this embodiment, when a path first occurs, it is highlighted as a white path. As a path occurs more and more often, the path is filled in or darkened. Accordingly, paths which do not occur often remain highlighted as white paths. As mentioned above, other highlighting schemes may be used. The user clicks on the highlighted path and the display automatically returns to the date and time that month that the path first occurred. In this example, the display shown in FIG. 10 is then presented to the user. It is seen that this path first occurred on Mar. 7, 2002 at 2 am. Clicking on that path again will change the display to the date and time that the path next occurred. If that path did not occur again, the display will not change. As shown in FIG. 10, by viewing the IT assets that the employee accessed that day, the user sees that in addition to assessing the Development, Email and Web IT assets, the employee also accessed the Client Information IT assets. We know that this employee is a developer and normally would have no reason to attempt to use the Client Information IT assets. This employee can then be questioned regarding this matter, or can be watched more carefully for any suspicious activity. The user may be given the opportunity to flag the anomaly, so that it can easily be retrieved for viewing at a later time. For example, after clicking on the highlighted path, the user may be presented with a GUI asking the user if they desire to flag the anomaly. If the user desires, they can name the anomaly for easy reference at a later time.

Figure 11:
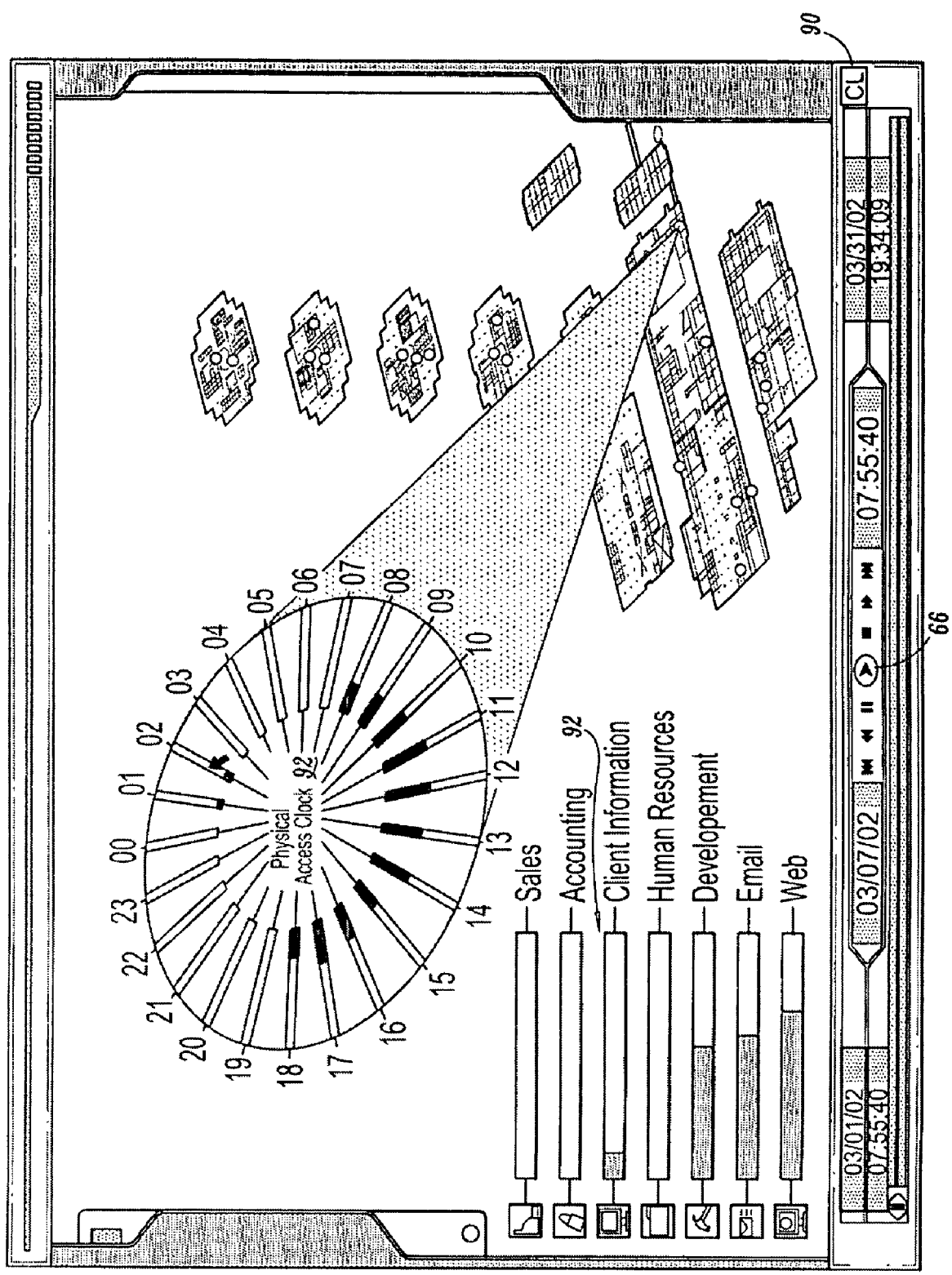
Figure 12:
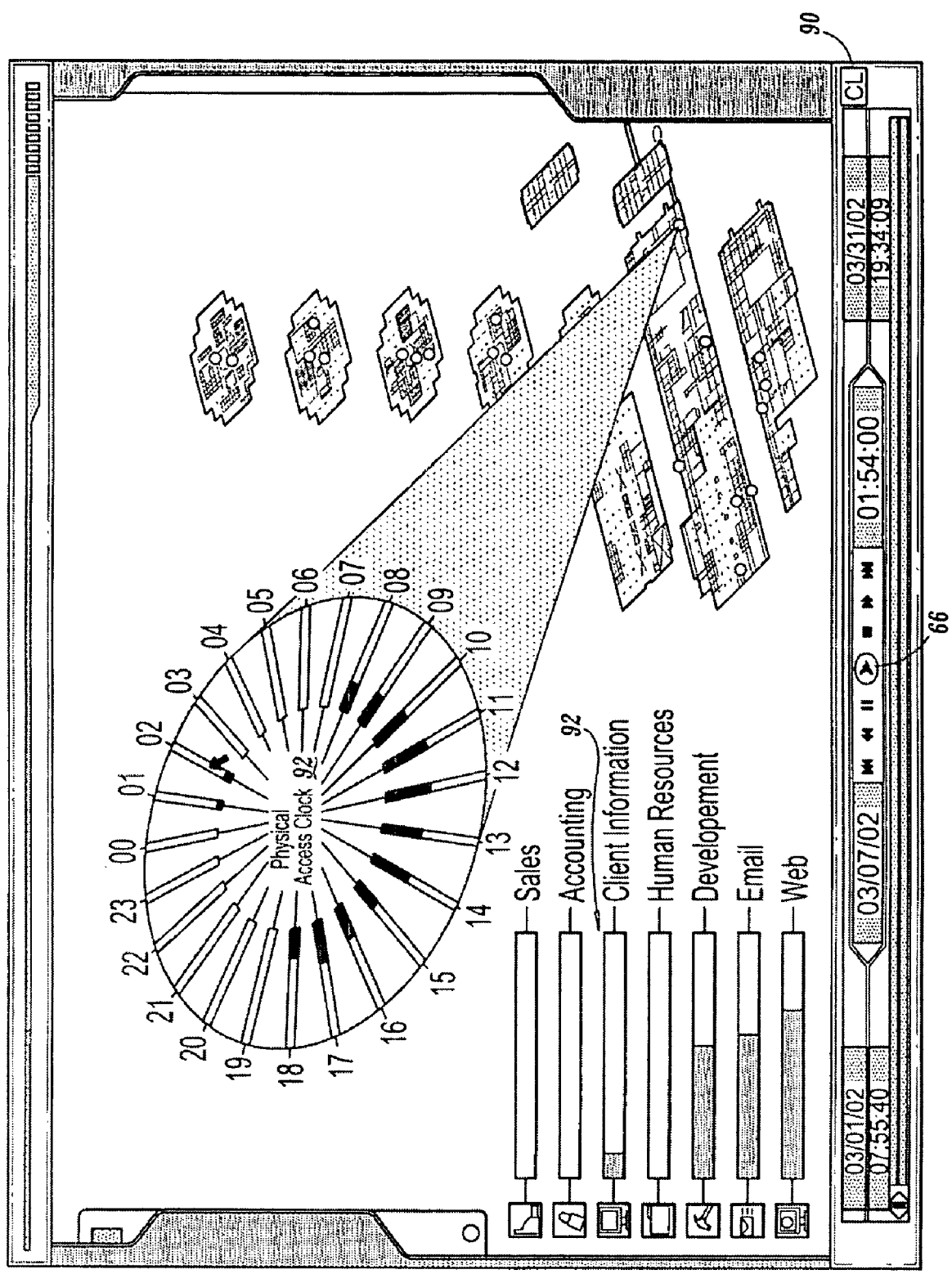

Now, let's assume that the after the month of data has been displayed, no paths are highlighted. This indicates that the employee has not deviated from his normal movements through the building. However, perhaps looking more closely at the times the employee was in the building will disclose something. The display 2 may also include a clock button CL 90, as shown in FIG. 10. Clicking on button 90, the user is presented with a clock dial 92 as shown in FIG. 11. Clock dial 92 includes 24 hour markings as shown. The clock shows the employee's physical security log events for each hour of the day. Each time the user clicks on play button 66 steps the clock forward 24 hours so that each day's physical access occurrences can be seen. In FIG. 11, the physical access occurrences for each hour of that day (Mar. 7, 2002) are seen on the dial face as vertical bars. Also shown in the bottom left hand corner of the display are the employee's IT asset access occurrences for that day. We see that in addition to having physical access occurrences during normal business hours (8 am–6 pm), the employee also had physical access occurrences that day at 1 am and 2 am. We also see that the employee has accessed the Client Information IT assets on that day. The user clicks on the Client Information bar 92 and the view switches to the time that the first access of Client Information IT assets occurred. In this example, the view shown in FIG. 12 is displayed. We see that this access occurrence to the Client Information IT assets occurred at 1:54 am and we know that the employee was in the building at this time. This again indicates suspicious activity. The employee can then be questioned or monitored more closely.

Additionally, the unusual access might trigger the generation of an anomaly. This anomaly will be indicated by a color or symbol superimposed on the visual display. The user can then pull up specific statistical information about the anomaly by clicking on the anomaly representation. In this case, by clicking on the anomaly, the user is presented with the clock dial 92. Anomalous access is illustrated on the clock dial 92 using a distinct color than normal access. For example, normal access might be illustrated with green bars while anomalous access is illustrated with red bars.

Figure 14:
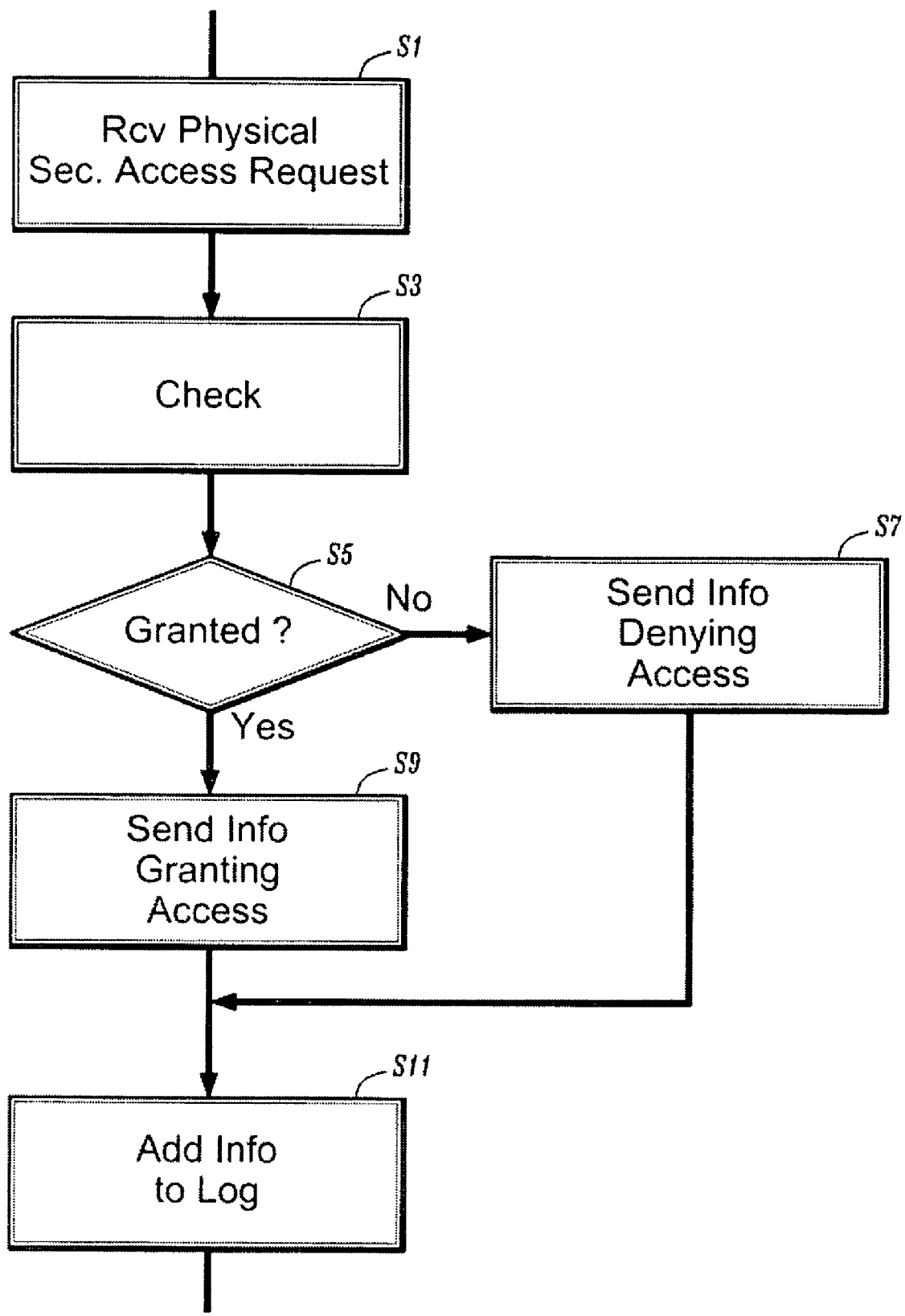
FIG. 14 is a flow chart for describing the creation of the physical access log.

FIG. 14 is a flow chart for describing a system for obtaining physical access information and creating a log thereof. In Step S1, a security access query is received from a security access station, at the central monitoring station 4. As noted above, this query can include the name of the party desiring to gain access to an area and or some other form of identification uniquely identifying the party (e.g., an employee ID). The security access query also includes location information, identifying the location issuing the query. In response, the central monitoring station 4 will access a database to retrieve information for that employee, indicating their security access clearance and/or whether they are allowed access to that particular area (Step S3). If the party is entitled access to that area (YES, Step S5), information is returned to the security access station indicating that the person may be granted access (Step S9). If the security access station is in the form of a security guard, the guard can then allow the party to enter the area. If the security access station is in the form of a badge reader, the badge reader will unlock the door in response to the information returned from the main monitoring station. If access has been denied (NO, Step S5), the party is not permitted access to the area and information is sent to the security access station indicating that access should be denied (Step S7). In the case of a security guard, the guard can then inform the party that they are denied access. In the case of a badge reader, a visible indication such as a red light can be displayed to the party, informing them that access is denied. The central monitoring station 4 also adds information to that employee's physical access log (Step S11) identifying the specific security access station that issued the query, the date and time of the query, and whether access was granted or denied.

Various other types of information may also be used to monitor an individual's location and/or their usage habits of, for example, office equipment, etc. Buildings, offices, warehouses, airports, etc. often include multiple types of office equipment for use by employees. The office equipment may include facsimile machines, copy machines, telephone systems, etc. These systems often use some form of access clearance prior to granting usage rights to an operator. For example, copy machines may require an operator to input certain types of information including a unique ID uniquely identifying the operator, prior to allowing the operator to use the copy machine. Facsimile machines, phone systems, printers, etc. may also be configured to require the operator to input their ID prior to granting usage rights. These systems are often connected to one or more monitoring systems, so that billing information, status and usage information and/or maintenance information can be gathered and monitored. This information may then also be used by the present monitoring system to provide additional information regarding the location of an individual as well as information regarding office equipment usage habits of the individual that might be helpful in determining abnormal activity by the individual. Other types of office equipment to which the present disclosure may also be applied might include heating, vacuuming and air conditioning (HVAC) units which require a user to enter an ID prior to being allowed to use the units.

Figure 15:
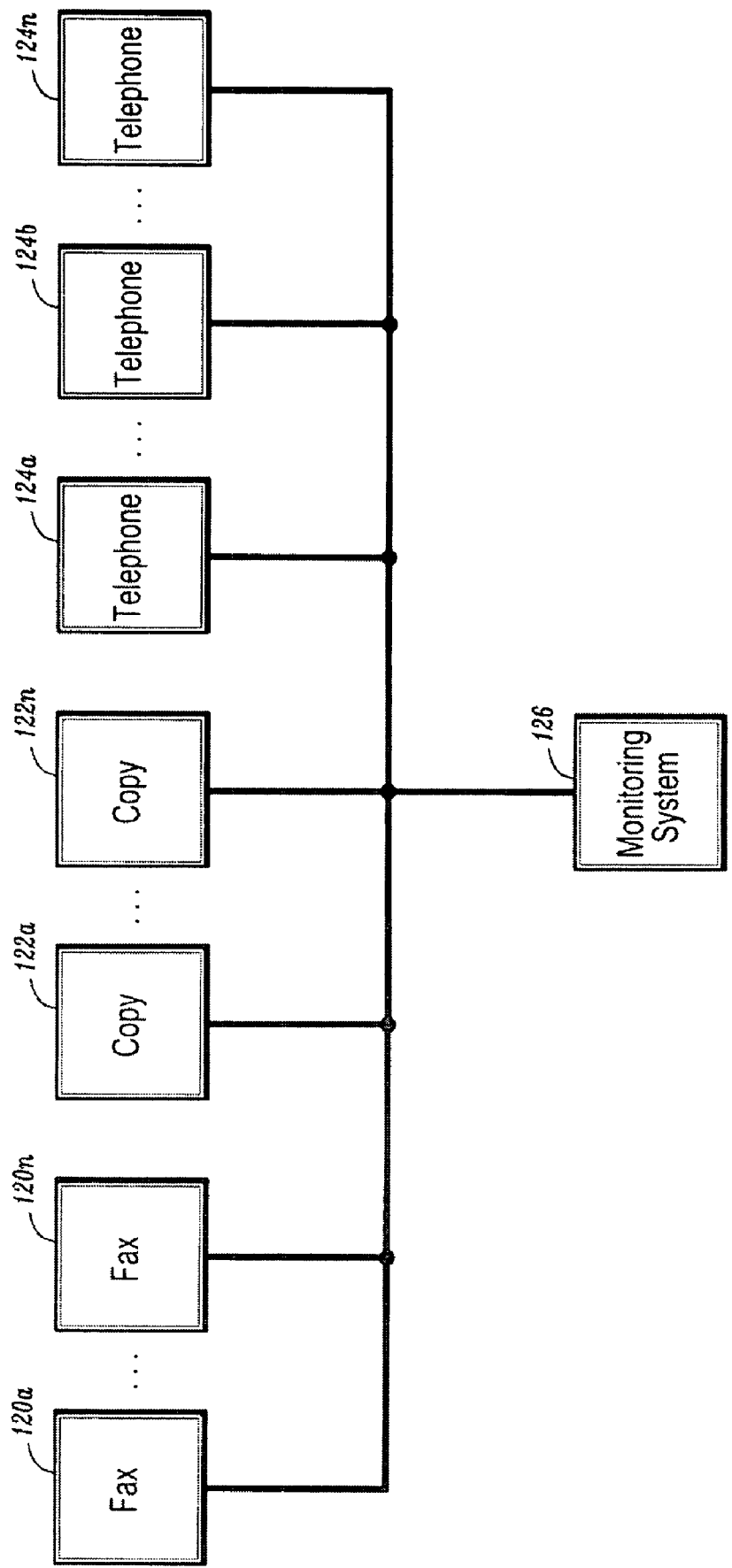
FIG. 15 is a block diagram depicting various exemplary types of office equipment to which various aspects of the present disclosure may be applied.

FIG. 15 depicts a block diagram of an office equipment system including various types of office equipment. As shown, the office equipment may include one or more facsimile machines 120a–120n, one or more copy machines 122a–122n, one or more telephone units 124a–124n, etc. Usage information from each machine or unit is communicated to the one or more monitoring systems 126 for collecting information regarding the usage of each system. The information might include the user ID information which the user is required to enter prior to being granted the right to use the piece of equipment. The information might also include information identifying the piece of equipment (e.g., a machine ID) and/or the location of the piece of equipment, as well as the date and time that usage was requested by the user and whether usage was granted or denied. The one or more monitoring systems 126 might be the same as the central monitoring station 4 described above, or might be separate therefrom. For example, monitoring system(s) 126 may simply provide data to central monitoring station 4 periodically or in response to a request from the central monitoring station 4. For example, it will be appreciated that telephone units 124a–124n may be connected to a telephone exchange system (not shown) which includes a system that grants or denies access to the phone system subject to the user being authenticated and monitors the phone usage. The telephone system may then communicate access history information which may include information identifying the location of the telephone, date and time of access, the user requesting access, etc. This information can be forwarded to central monitoring station 4 in realtime, periodically or in response to a request from the central monitoring system 4.

Log records can be compiled identifying what office equipment was accessed, when it was accessed, etc. The information being stored with the log records may include information identifying the type of each piece of office equipment being accessed and/or its location. An example of an Office Equipment Access Log is shown in FIG. 16.

Office Equipment Access Log 130 may include various types of information including identification information 132 identifying the individual that requested usage of a piece of office equipment. In this example, employee "John Wey's" office equipment access log is depicted. It will be appreciated that although depicted as one log, each type of office equipment might have its own log. In addition, it will be appreciated that the office equipment log information might be combined with one or more of the physical access log information and the IT access log information described above. Equipment ID 134 may be provided which uniquely identifies each piece of equipment. Type information 135 may be provided which identifies the actual type of equipment (facsimile, phone, copy machine, etc.) Location information 136 may be provided which identifies the location of the equipment. Time and Date information 138, 140 may be provided which identifies the date and time that the office equipment was attempted to be accessed. Access allowed/denied information 142 may be provided for indicating whether the operator was granted or denied access to the office equipment.

The office equipment usage information might also be used to provide additional information for the physical access log. For example, when an employee enters their ID code into a copier, facsimile machine, etc., information identifying the copier, facsimile machine (and/or the location of the copier, facsimile machine, etc) and information identifying the employee can be sent to the central monitoring station 4 to be stored in the employee's physical access log.

Figure 17A:
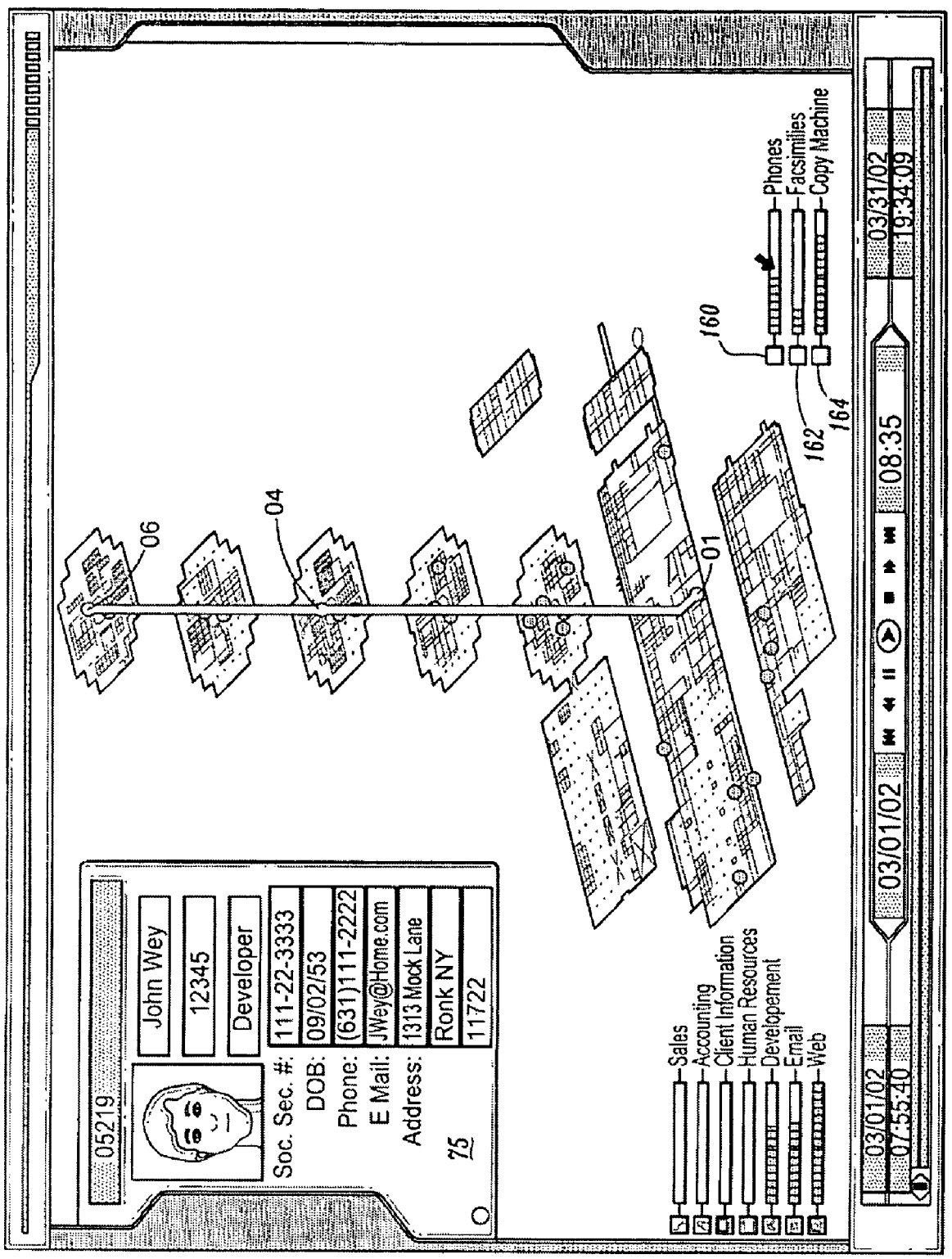
FIGS. 17A–17C are displays depicting office equipment usage.
Figure 17B:
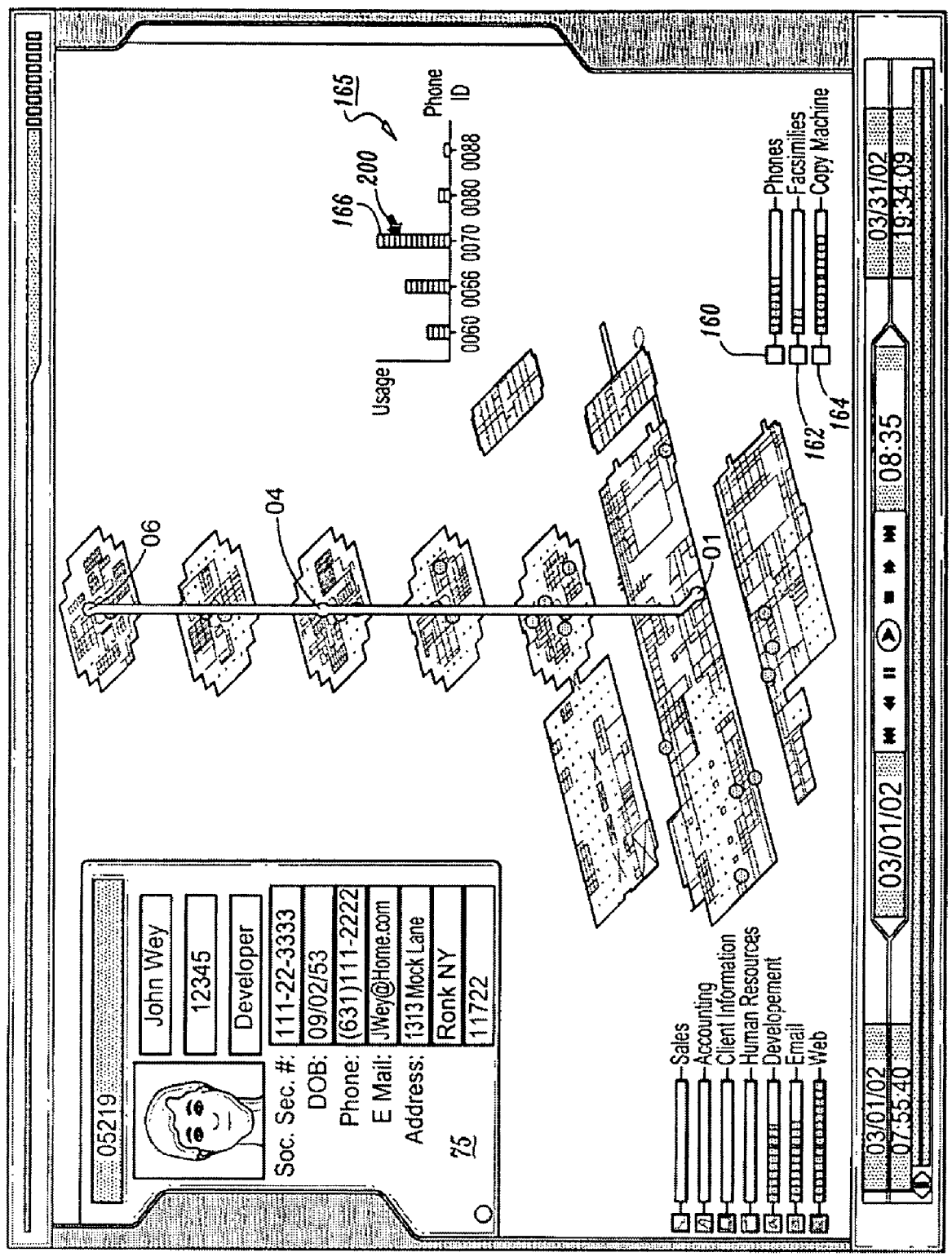
Figure 17C:
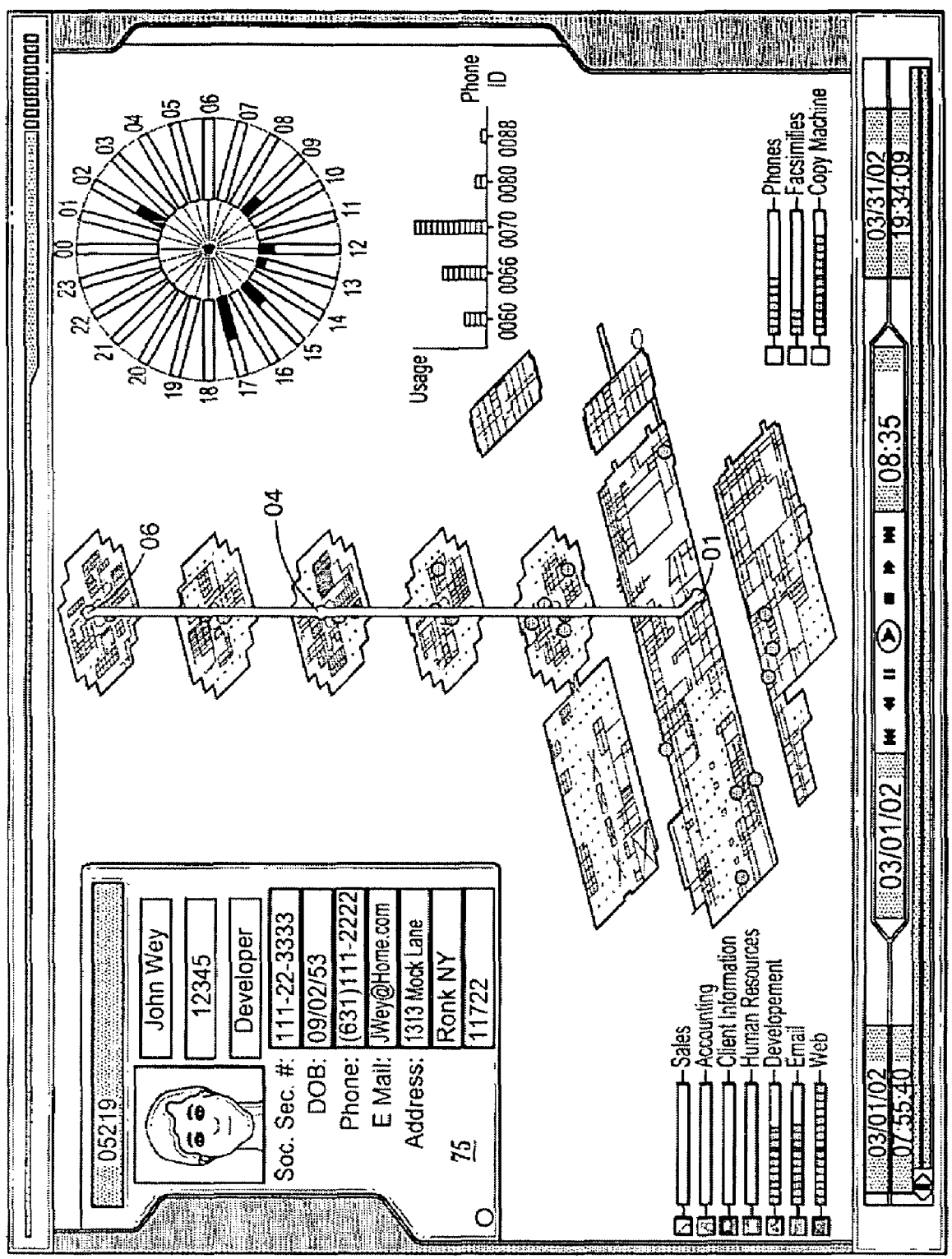

The Office Equipment Access Log information 130 can also be presented to a user of the present system in an easy to comprehend visual format, providing additional information for monitoring the whereabouts and/or equipment usage habits of an individual. For example, as shown in FIG. 17A, this information can be presented in a manner similar to the IT asset information as described above. As shown, information showing phone usage 160, information showing facsimile usage 162 and information showing copy machine usage 164 may be displayed in bar graph form. Each bar graph displays a user's relative usage of each type of equipment for each day in question. When a particular day is selected to view in more detail, moving cursor 200 and clicking on one of the bars 160–164 will present more detailed visual data. For example, clicking on bar 160 will display a bar graph 165 as shown in FIG. 17B that shows which phones the person in question used that particular day and the relative number of times the phone was used. Moving cursor 200 and clicking on one of the columns (e.g., column 166), will present a display indicating the times that phone was used by the employee that day, as shown in FIG. 17C. The same type of bar graph displays can be provided for each type of office equipment. This provides security personnel with valuable information which can be used to trace an employee and view their usage habits of different types of office equipment.

A video system may also be incorporated into the present system. Video security cameras are often set up at key points throughout a building or area. The video cameras may provide feeds to a central video monitoring station, where security personnel can visually monitor the areas. This video data can be stored and then retrieved by the present system. The video data is time stamped so that it can be synchronized with the other data being displayed by the present system. For example, the video from one or more video security cameras can be displayed in separate windows on display 2 along with the other information being displayed. The video can be presented as a full screen display, or as a small window on the display.

Figure 18:
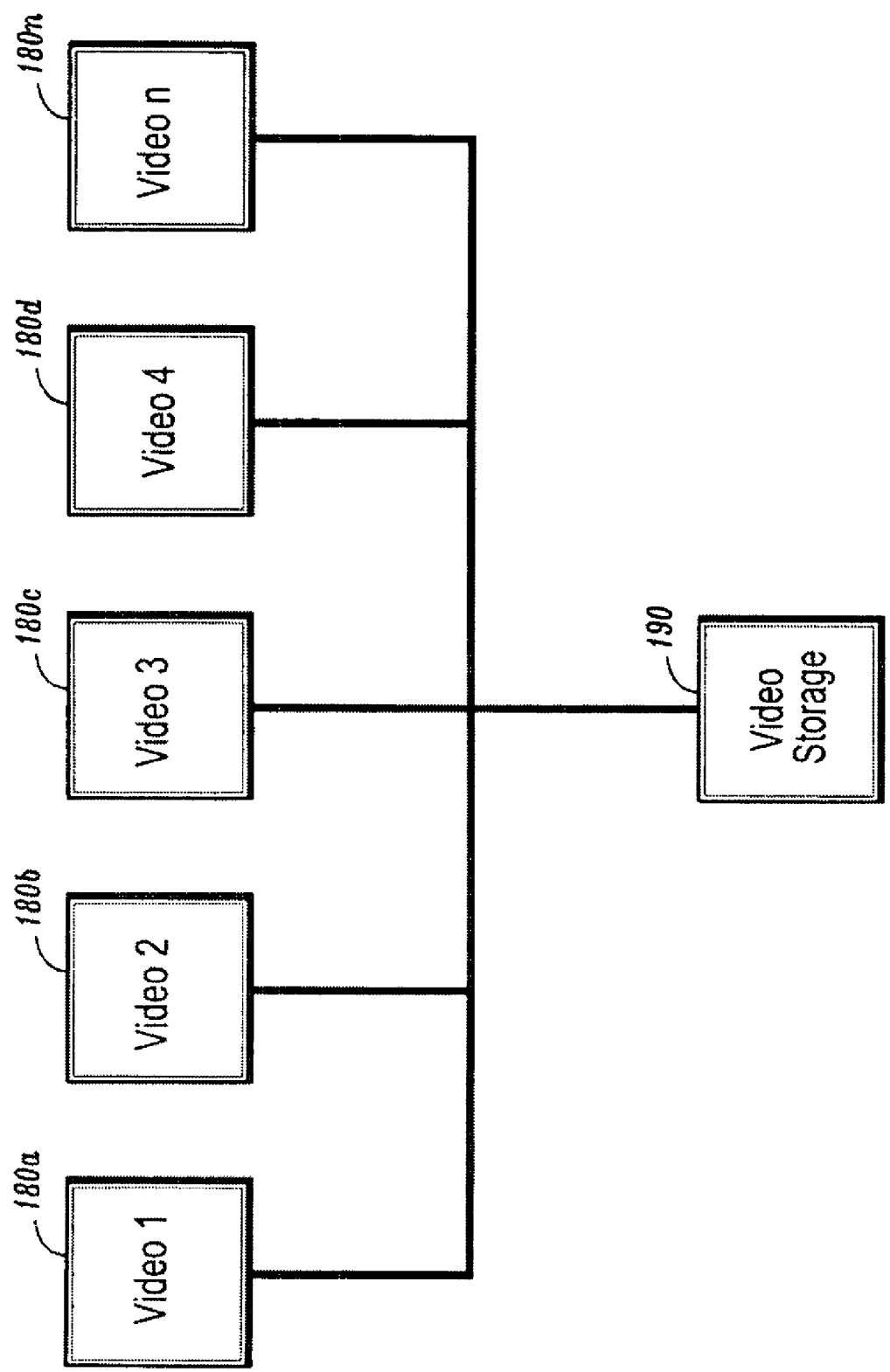
FIG. 18 is a block diagram of a video surveillance system.

A block diagram of an example of a video monitoring system is shown in FIG. 18. One or more video camera units 180a–180n are provided at various key locations throughout a building or area. The video from each unit 180a–180n is communicated to one or more video storage systems 190, either via a wired or wireless connection, where it can be time stamped and stored. The monitoring system according to the present disclosure can then retrieve selected video from storage systems 190 as desired. A GUI can be provided allowing the operator to select one or more video feeds to view.

Figure 19:
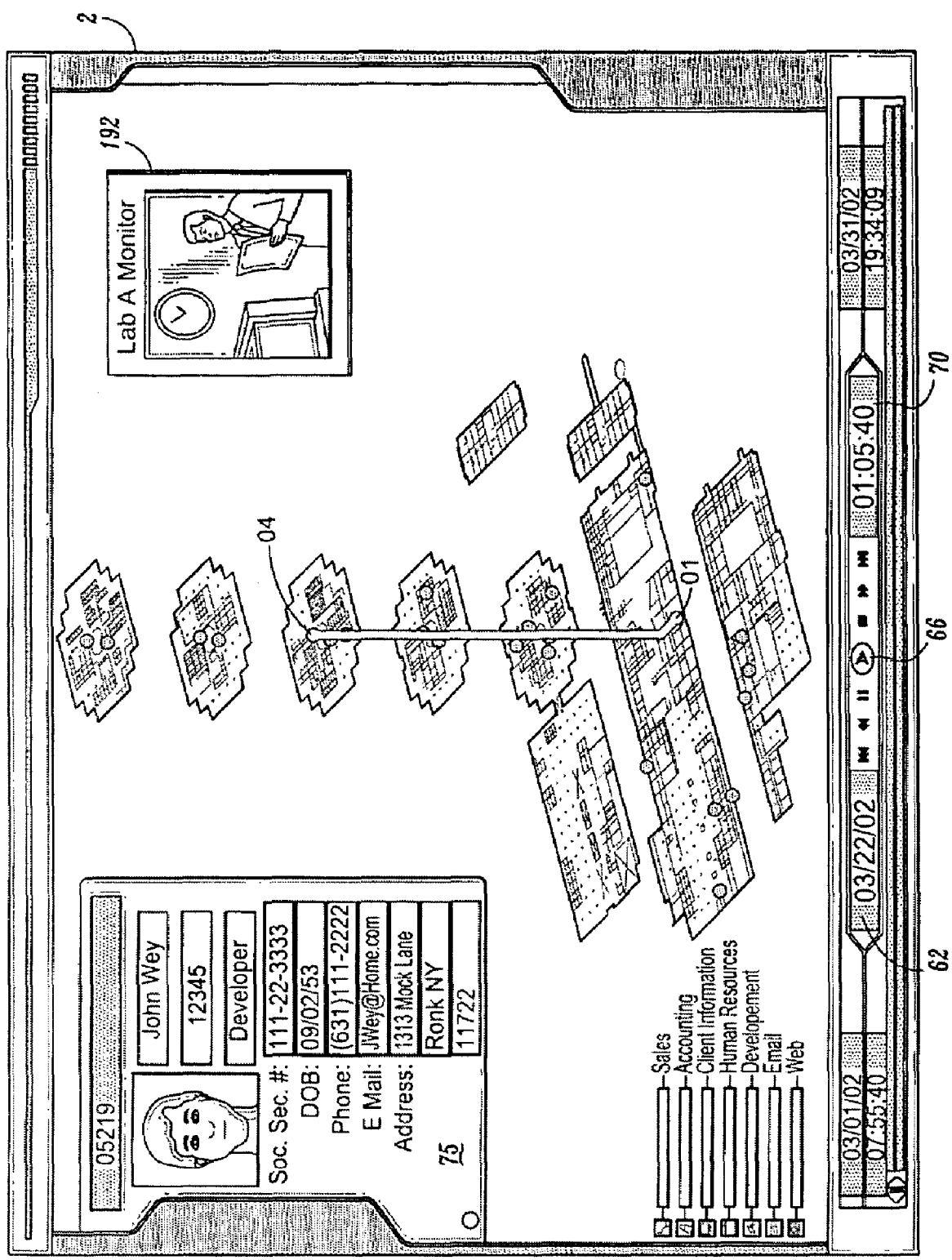
FIG. 19 is a display depicting usage of a video surveillance information.

FIG. 19 shows a display 2 including a video window 192 which displays a video feed. In this embodiment, the operator used the GUI to select to view security monitor "LABA" which is provided in the main lab in the building. The operator is viewing in window 192, a segment of video which occurred around 1:05 am on Mar. 22, 2002, as shown by boxes 62 and 70. The video for the selected video camera can be retrieved from storage 190 and when the user presses start button 66, video for that time period can be displayed along with the physical access information being shown on the rest of the display. The video data can also be displayed in real time along with one or more of the physical access information, IT access information and the office equipment usage information.

The present system and method can also display the physical accesses and/or IT accesses and/or office equipment usage information and/or video data in real time as they occur, giving the security department a powerful tool for monitoring personnel in the building or area.

Of course, the present system may be arranged to display or visualize the use of any one or any combination of one or more of the various types of information described above.

The present disclosure may be conveniently implemented using one or more conventional general purpose digital computers and/or servers programmed according to the teachings of the present specification. Appropriate software coding can readily be prepared based on the teachings of the present disclosure. The present disclosure may also be implemented by the preparation of application specific integrated circuits or by interconnecting an appropriate network of conventional component circuits.

Numerous additional modifications and variations of the present disclosure are possible in view of the above-teachings. It is therefore to be understood that within the scope of the appended claims, the present disclosure may be practiced other than as specifically described herein.

What is claimed is:

1. A security method comprising:
   receiving equipment usage data indicating access to a network asset, the equipment usage data associated with a uniquely identified object;
   receiving physical access data identifying the physical location of the uniquely identified object from at least one physical security device; and
   normalizing said received equipment usage data and physical access data based on the uniquely identified object; and
   storing the equipment usage data and physical access data in a record associated with the uniquely identified object.

2. The security method of claim 1 further comprising:
   statistically evaluating at least one of the equipment usage data and physical access data; and
   using the statistically evaluated data to determine if predetermined rules have been broken.

3. The security method of claim 1, wherein the at least one physical security device comprises a badge reader at an access point.

4. The security method of claim 1, wherein the equipment usage data comprises data indicating usage by a user of a piece of equipment selected from the group consisting of a telephone, a computer, a fax machine, and a copy machine.

5. The security method of claim 1, wherein the uniquely identified object comprises a person, and wherein said normalizing comprises:
   identifying the person associated with the equipment usage data and physical access data; and correlating the equipment usage data and physical access data based on the identified person.

6. The security method of claim 5, wherein said uniquely identified object comprises a particular individual, the equipment usage data relates to usage by the particular individual of a computer, and the physical security device comprises a badge reader.

7. The method of claim 1, further comprising accessing a database, in response to receiving at least one of the equipment usage data and the physical access data, to find personnel information associated with a person.

8. The method of claim 7, further comprising:
receiving a user command; and
in response to the user command, generating a report summarizing the equipment usage data and the physical access data.

9. A security monitoring system comprising:
a network asset operable to transmit equipment usage data associated with a uniquely identified object;
at least one physical security device operable to transmit physical access data identifying the physical location of the uniquely identified object; and
a processor operable to:
receive the equipment usage data and physical access data; and
normalize the equipment usage data and physical access data based on the uniquely identified object; and
a database for storing the equipment usage data and physical access data in a record associated with the uniquely identified object.

10. The security monitoring system of claim 9 wherein the processor is further operable to:
statistically evaluate at least one of the equipment usage data and physical access data; and
use the statistically evaluated data to determine if predetermined rules have been broken.

11. The security monitoring system of claim 9, wherein the at least one physical security device comprises a badge reader at an access point.

12. The security monitoring system of claim 9, wherein the equipment usage data comprises data indicating usage by a user of the network asset, the network asset selected from the group consisting of a telephone, a computer, a fax machine, and a copy machine.

13. The security monitoring system of claim 9, wherein the uniquely identified object comprises a person, and wherein the processor is further operable to:
identify the person associated with the equipment usage data and physical access data; and
correlate the equipment usage data and physical access data based on the identified person.

14. The security monitoring system of claim 9, wherein:
the uniquely identified object comprises a particular individual;
the network asset comprises a computer and the equipment usage data relates to usage by the particular individual of the computer; and
the physical security device comprises a badge reader.

15. Logic for providing security within an enterprise, the logic encoded in a medium and operable to:
receive equipment usage data indicating access to a network asset, the equipment usage data associated with a uniquely identified object;
receive physical access data identifying the physical location of the uniquely identified object from at least one physical security device; and
normalize said received equipment usage data and physical access data based on the uniquely identified object; and
store the equipment usage data and physical access data in a record associated with the uniquely identified object.

16. The logic of claim 15 further operable to:
statistically evaluate at least one of the equipment usage data and physical access data; and
use the statistically evaluated data to determine if predetermined rules have been broken.

17. The logic of claim 15, wherein the logic is operable to receive the physical access data from a physical security device comprising a badge reader at an access point.

18. The logic of claim 15, wherein the logic is operable to receive equipment usage data comprising data indicating usage by user of a piece of equipment selected from the group consisting of a telephone, a computer, a fax machine, and a copy machine.

19. The logic of claim 15, wherein the uniquely identified object comprises a person, and wherein the logic is further operable to:
identify the person associated with the equipment usage data and physical access data; and
correlate the equipment usage data and physical access data based on the identified person.

20. The logic of claim 15, wherein the uniquely identified object comprises a particular individual, the equipment usage data relates to usage by the particular individual of a computer, and the physical security device comprises a badge reader.

* * * * *